(12) United States Patent
Allibhoy et al.

(10) Patent No.: US 6,980,972 B1
(45) Date of Patent: Dec. 27, 2005

(54) METHOD AND SYSTEM FOR CONTROLLING AND AUDITING CONTENT/SERVICE SYSTEMS

(75) Inventors: Nizar Allibhoy, Northridge, CA (US); L. Dane Elliott, Hermosa Beach, CA (US); Joaquin Fernandez-Silva, Manhattan Beach, CA (US); Stephen M. Johnson, Burbank, CA (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 418 days.

(21) Appl. No.: 09/636,037

(22) Filed: Aug. 9, 2000

Related U.S. Application Data

(60) Provisional application No. 60/203,461, filed on May 11, 2000.

(51) Int. Cl.⁷ .............................................. H04L 9/00
(52) U.S. Cl. ............................ 705/51; 705/57; 705/59; 705/54; 705/58; 713/201; 380/4; 380/23; 395/186; 395/187.01; 395/188.01; 395/200.59
(58) Field of Search ................................ 705/1, 26, 51, 705/57, 59

(56) References Cited

U.S. PATENT DOCUMENTS

| | | | |
|---|---|---|---|
| 5,347,632 A | 9/1994 | Filepp et al. ................. 395/200 |
| 5,664,110 A | 9/1997 | Green et al. .................. 705/26 |
| 5,710,887 A | 1/1998 | Chelliah et al. ............. 395/226 |
| 5,715,403 A * | 2/1998 | Stefik ............................ 705/44 |
| 5,742,759 A * | 4/1998 | Nessett et al. ............... 713/201 |
| 5,745,681 A | 4/1998 | Levine et al. ............. 395/200.3 |
| 5,897,622 A | 4/1999 | Blinn et al. ................... 705/26 |
| 5,910,987 A * | 6/1999 | Ginter et al. ................. 705/52 |
| 5,963,915 A | 10/1999 | Kirsch .......................... 705/26 |
| 5,970,472 A | 10/1999 | Allsop et al. ................. 705/26 |
| 6,016,504 A | 1/2000 | Arnold et al. ............... 709/200 |
| 6,016,509 A * | 1/2000 | Dedrick ....................... 709/224 |
| 6,044,469 A * | 3/2000 | Horstmann .................. 713/201 |
| 6,167,378 A * | 12/2000 | Webber, Jr. ..................... 705/8 |
| 6,401,085 B1 * | 6/2002 | Gershman et al. ............. 707/4 |

FOREIGN PATENT DOCUMENTS

EP          332707 A1 * 9/1989         ............. G06F 7/28

OTHER PUBLICATIONS

Williams, Paul Whitton, Andrew—Balance Sheet, v8n3, p. 37-39, Spring 2000.*
Enhanced Content Specification, Advanced Television Enhancement Forum (ATVEF), v.1.1 r26. pp. 1-38.
T. Wugofski, A Modular Hypertext markup Language for Broadcast Applications, pp. 1-189.

* cited by examiner

*Primary Examiner*—James P. Trammell
*Assistant Examiner*—Daniel L. Greene
(74) *Attorney, Agent, or Firm*—Joseph S. Tripoli; Ronald H. Kurdyla; Joel Fogelson

(57) ABSTRACT

An improved interactive network system is provided that allows the Network Operator to control the transfer of information to and from the network end users, the system preferably using triggers or markers embedded within the programming broadcast to users via the network. As a consequence of this system, the Network Operator is able to efficiently garner revenues from third parties transacting business over the network and to control the look and feel of programming offered to network users. Additionally the system can be used as a means of limiting network access, filtering programming, providing on-screen graphics or audible signals for particular programming types or providers, bookmarking programming, profiling network users, targeting advertising, and simplifying network transactions.

23 Claims, 13 Drawing Sheets

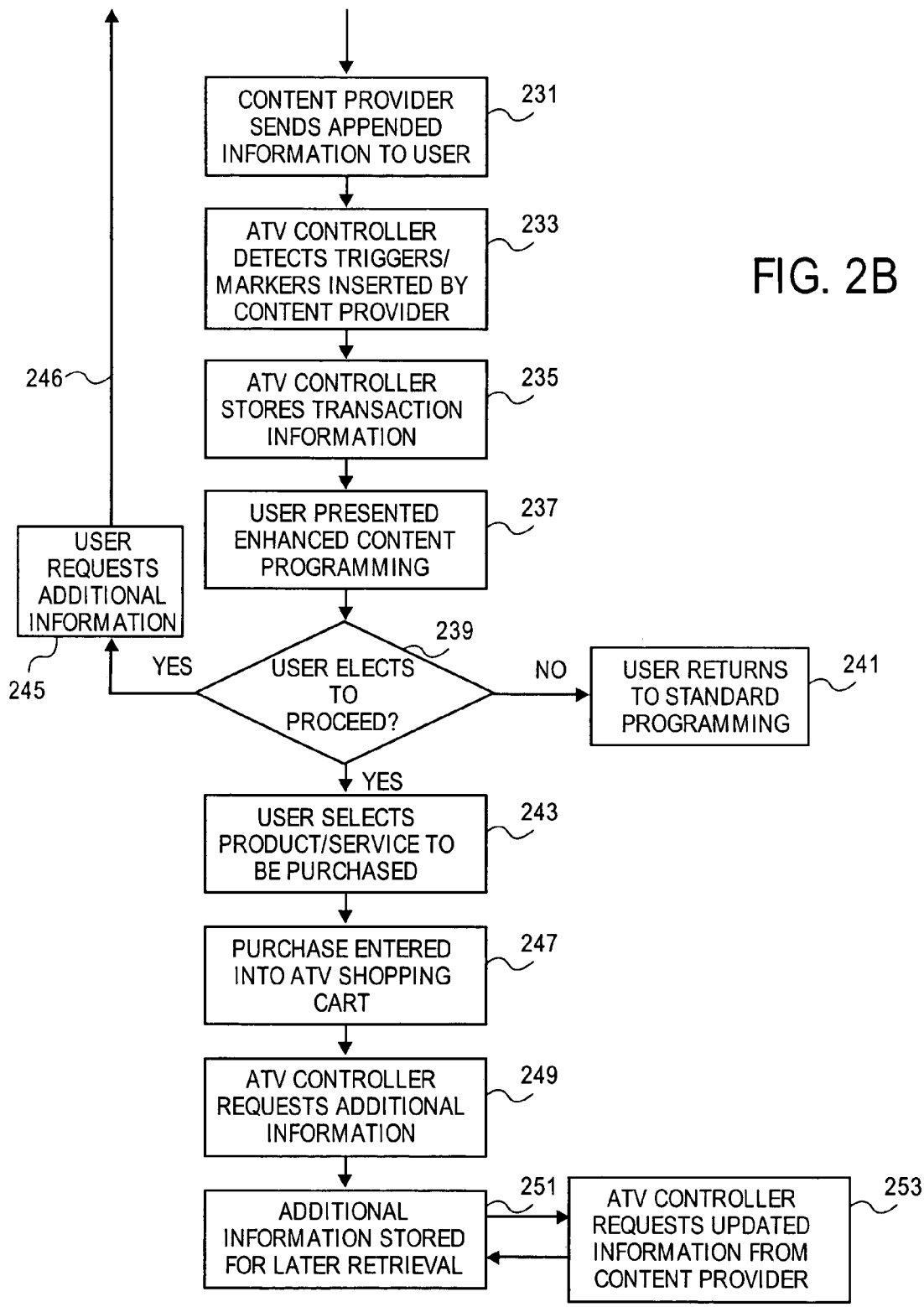

BASIC SYSTEM METHODOLOGY

METHOD AND SYSTEM FOR CONTROLLING AND AUDITING CONTENT/SERVICE SYSTEMS

RELATED APPLICATIONS

This application claims the benefit of U.S. Provisional Application No. 60/203,461, filed May 11, 2000, the disclosure of which is incorporated by reference.

FIELD OF THE INVENTION

The present invention relates generally to networks and, more particularly, to a method and system for providing means for an operator of a network to control and audit interactions between a third party content/service provider coupled to the network and an end user.

BACKGROUND OF THE INVENTION

Enhanced television broadcasts, the Internet, and other information transferal technologies allow an end user to actively interact with a variety of different content and service providers as opposed to only passively receiving information. Accordingly a user can request additional information or purchase goods and services from a third party that is only indirectly affiliated with the network and its operator.

An interaction between a user and a third party may be initiated in a variety of ways. For example, the user can initiate the interaction without consideration to the information currently being presented by the network (e.g., user wishes to obtain status information about an airline arrival time in the middle of watching a movie). Alternately, the user may initiate the interaction in response to a prompt within the material currently being viewed (e.g., a prompt within a television advertisement pertaining to additional available information such as specifications, delivery, pricing, etc.). Alternately, a third party may initiate the interaction by requesting that the user provide additional information (e.g., polling).

Regardless of how the interaction is initiated, once initiated the user interacts directly with the third party. Unfortunately, although the network supplies the conduit for the interaction, the operator of the network is unable to monitor the interaction. As such, the operator is unable to control the interaction, including the look and presentation of the materials provided to the user during the interaction. Additionally, as the operator cannot monitor the interaction, they are unable to insure that they are receiving compensation for any interactions flowing over the network. As a consequence of this inability to capture revenues from these network interactions, in many instances the operator is unwilling to upgrade a network to the extent necessary to provide user interactivity. In other instances, although the basic infrastructure necessary for user interactivity is in place, the operator may be reluctant to make improvements (e.g., interactivity speed). In still other instances, the user may be charged a flat rate for interactivity capabilities.

What is needed in the art is a method and a system that allows interactions occurring between a network user and a third party to be monitored. The present invention provides such a method and system.

SUMMARY OF THE INVENTION

The present invention provides an improved interactive network system that allows the Network Operator to control the transfer of information to and from end users that are coupled to the network. By providing a control mechanism, the Network Operator is able to efficiently garner revenues from third parties transacting business with the end users via the network.

In one aspect of the invention, a Controller is used to monitor and control interactions between users and Content Providers. By controlling interactions, the Network Operator can determine which Content Providers are allowed to interact with users via the network as well as the format of the interaction. Additionally, the Network Operator can charge Content Providers for the opportunity to transact business via the network. Controllable interactions include e-commerce, interactive advertising, polling, couponing, lead generation, etc.

In another aspect of the invention, the Controller coupled to the network monitors for triggers or other markers embedded within enhanced content programming provided by various Content Providers. The Controller can use these triggers or markers in a variety of ways. First, Content Provider access to the network can be limited to authorized Content Providers, authorization typically being given to those Content Providers that agree to a specific programming format and/or agree to a fee arrangement with the Network Operator. Second, the triggers/markers can be used for filtering purposes, allowing the end user, the Network Operator, the Controller, or other party to filter the enhanced content programming that is provided to a specific end user. Third, specific on-screen graphics or audible signals can be matched to specific types of enhanced content programming or programming from particular providers. Fourth, the system can be configured to allow users to bookmark programming, primarily using triggers/markers as a bookmarking technique.

In another aspect of the invention, user requests for enhanced content programming are intercepted and forwarded to the Controller which appends various parameters and information to the user request prior to forwarding the request to the designated Content Provider. The appended parameters/information can include network and Network Operator specifications, end user Receiver specifications, business and/or technical rules, user profiles, etc. The Controller monitors the programming returned by the Content Provider and, as necessary, stores transactional information in memory.

According to yet another aspect of the invention, software resident within an end user's Receiver intercepts user transaction requests and strips the requests of certain information. Additionally, the software inserts a Controller parameter list that includes Controller address information and which may also include various system requirements. The modified user transaction request is then forwarded to the user designated Content Provider. If the designated Content Provider abides by the system requirements, the transaction is allowed to proceed. Depending upon the system configuration, the designated Content Provider may require additional information from the Controller or the Network Operator. If the designated Content Provider does not abide by the system requirements, the transaction is terminated.

According to yet another aspect of the invention, the Controller allows user transaction requests to go directly to the designated Content Provider. If the Content Provider appends the required markers to the programming and abides by the system requirements, the programming is allowed to pass to the end user, thus completing this phase of the transaction. Marker and system information can be provided to Content Providers via an open API or other means. If the Content Provider does not include the required markers to the programming or otherwise does not abide by the system requirements, the programming is not allowed to pass to the end user. Preferably the Content Provider is either notified of the system requirements at this point or instructed as to how to obtain the system requirements.

According to yet another aspect of the invention, transactional information between an end user and a Content Provider is stored within a Shopping Cart under the control of the Controller. The Shopping Cart allows an end user to initiate a transaction at one point in time and conclude or finalize the transaction at a different point in time. By allowing the user to postpone transaction finalization, spontaneous transactions are encouraged. Preferably, once the user initiates a transaction, the Controller obtains additional transactional information from the Content Provider thus allowing the Controller to directly conclude the transaction with the end user. An additional benefit of the Shopping Cart is that it allows the end user and/or the Network Operator to track transactions. Thus the end user can easily enforce budgets and parental controls while the Network Operator can enforce Content Provider fee arrangements.

According to yet another aspect of the invention, the data screens associated with the Shopping Cart include advertising, the advertising covering some portion of each data screen. The advertising may be either static or dynamic and may include linking information to specific Content Providers offering the branded goods or services.

According to yet another aspect of the invention, a user profile is obtained for each network Receiver. Preferably multiple user profiles are permissible for each network Receiver, thus accounting for families of users, all of which are connected to the network by a single Receiver. User profiles preferably include billing and shipping information, thus allowing the Controller to expeditiously finalize user transactions. The user profile may also include Content Provider preferences, programming preferences, etc.

According to yet another aspect of the invention, the user profile is automatically developed by the Controller based on prior user transactions. Such information can include the category of purchased good or service, the number of items purchased, both in total as well as for a specific Content Provider, per item cost, the total cost per purchase, etc. The profile can be used by the Controller to suggest Content Providers or enhanced content programming that may be of interest to the user. The profile can also be used by the Controller to alter programming so as to target the specific user, for example by altering a Content Provider's spokesperson depending upon the user's profile. The profile can also be used for cross-selling purposes and to target advertising, such as that which may be included in the Shopping Cart screens, to a specific user.

A further understanding of the nature and advantages of the present invention may be realized by reference to the remaining portions of the specification and the drawings.

BRIEF DESCRIPTION OF THE DRAWINGS

FIGS. 2A–B illustrate the basic method associated with a system operating in accordance with the invention;

DESCRIPTION OF THE SPECIFIC EMBODIMENTS

Figure 1:
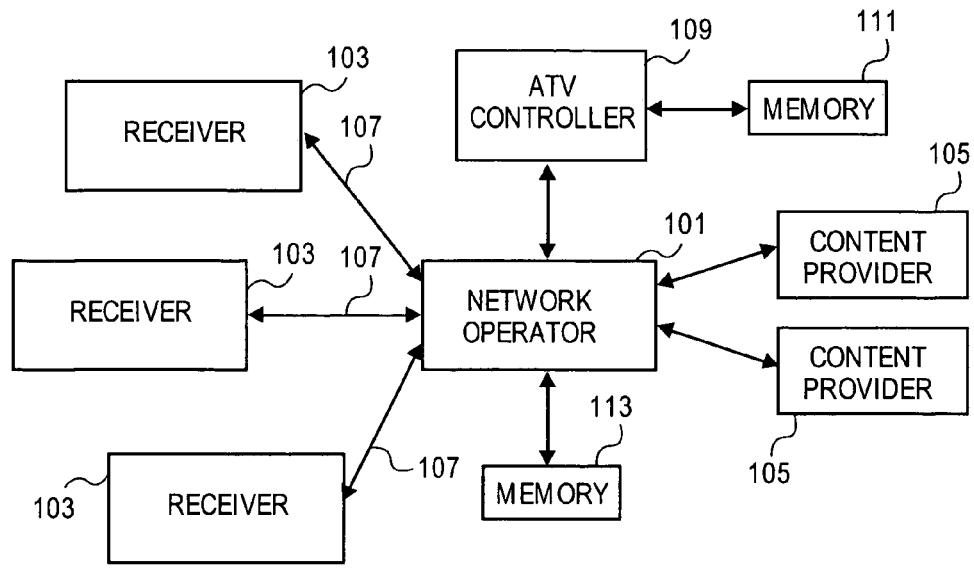
FIG. 1 is a schematic illustration of the basic system of the invention.

The specification is divided into the following sections:
I. System Overview
II. Network Operators
III. ATV Controller Use of Triggers
IV. Basic System Utilizing Content Provider Inserted Markers/Triggers
   1. Initial User Interaction
   2. Shopping Cart
   3. Transaction Tracking
   4. User Profiles
V. System Utilizing ATV Software Resident Within Receivers
VI. System Utilizing Data Filtering
VII. API Information
VIII. Additional Embodiments
   1. Profiling
   2. Branding
   3. Picture-in-Picture Viewing
   4. Trigger Filtering
      i) Source Control
      ii) Audio Triggers
      iii) Dynamic Replacement of Specific Content Utilizing Triggers
      iv) Trigger Bookmarks
      v) Cross Channel Triggers I. System Overview FIG. 1 is a schematic illustration of a system 100 in accordance with the invention. As shown, a service provider or Network Operator 101 provides user devices or Receivers 103 with various types of information, preferably at least some of which is provided by one or more Content Providers 105. The service provided to user devices 103 can be in the form of enhanced broadcast information that may include television signals, on-demand programming, Internet capabilities, and other related services. Alternately, the service provided by Network Operator 101 can be limited to a single service such as Internet access, thereby limiting the user to browsing the Internet. Accordingly, Network Operator 101 can be a cable operator, a satellite broadcaster/operator, an Internet service provider, or other provider offering any of the above noted services or similar services. User devices 103 can be any means that allow the user to view or otherwise access the information, in whole or in part, provided by Network Operator 101. In the preferred embodiment, Receivers 103 are set-top boxes that are coupled to a television. The set-top box can either be integral to, or separate from, the television. Alternately, Receivers 103 can be a telephone or a personal digital assistant (PDA) with Internet access capabilities, an Internet coupled computer, or other information receiving means. Information is provided by Network Operator 101 to Receivers 103 via network 107, network 107 being comprised of cable, fiber optics, telephone lines, terrestrial broadcast systems, satellite broadcast systems, or some combination thereof. The information provided by Content Providers 105 can include television programming, access to various goods and services, etc.

According to the invention, coupled to Network Operator 101 is an ATV (Accelerate TV) Controller 109. Controller 109 allows Network Operator 101 to control and audit the interactions between Receivers 103 and Content Providers 105. Additionally, ATV Controller 109 allows Network Operator 101 to enforce various business rules, thereby insuring that Content Providers 105 present information to user devices 103 with an acceptable look and feel. Controllable transactions include, but are not limited to, e-commerce, interactive advertising, polling, couponing, lead generation, etc. which flow between Receivers 103 and a specific Content Provider 105 via the network and Network Operator.

II. Network Operators

As previously noted, the present invention can utilize a variety of different network types on a variety of different electronic platforms. In the preferred embodiment, the service provided to the user is enhanced content television programming such as can be deployed on a television, set-top, or PC-based receiver. Enhanced television programming can operate over either analog or digital video systems using terrestrial, cable, optical fiber, satellite, or Internet networks. In contrast to standard television programming, enhanced television programming allows user interactivity.

Although there are a variety of techniques for providing enhanced television programming, they each generally provide standard programming such as would be supplied by any video network, including those providing non-enhanced content. In addition to standard programming, these various techniques supply the user with the enhanced content provided by Content Providers 105, the enhanced content including the necessary graphics, layouts, interactions, and triggers. In order to provide enhanced content, Network Operator 101 must be capable of transporting the enhanced content data while the Receiver (e.g., television, set-top box, PC-based system, etc.) must have the necessary hardware and software to decode and play the enhanced content. Preferably the Receiver also has means (e.g., keypad, remote control, touch-screen, etc.) for allowing the user to interact with enhanced Content Providers 105.

Examples of standards that are being promulgated for use with enhanced content programming include the Advanced Television Enhancement Forum (ATVEF) standard and the xHTML standard, the latter being drafted in cooperation with the Advanced Television Systems Committee (ATSC). Although there may be differences between the various standards and the requirements that they place on the Content Provider, the Network Operator, and the Receiver, they each require means for indicating when enhanced content is available as well as its location. This information, referred herein as a trigger, is provided via a data or trigger stream that accompanies the non-enhanced programming.

Triggers, and more specifically their arrival, notify the user, and/or the user's system, that enhanced content is available. For example, a trigger may cause an interaction symbol "i" to appear in the corner of the user's television screen, indicating that the user can interact with the system to find out more information, purchase a product, etc. Additionally, a trigger may be completely transparent to the user. In this instance the triggers may only be recognized by, and provide direction to, the system software.

Depending upon system implementation, the user may have the option of turning on or off the enhanced content. Similarly, the user may be required to accept the trigger prior to the enhanced content being provided. Additionally, Receiver 103 may include filtering means to filter out specific triggers.

In response to an accepted trigger, Receivers 103 process the trigger as well as the associated enhancements. Typically associated with each trigger is a uniform resource locator (URL) which provides the location of the enhancement. Since the hyper-text transfer protocol (HTTP) has been widely adopted as the foundational protocol of the World Wide. Web (Web), the URL will commonly utilize the HTTP protocol. The URL scheme also enables resources that are stored locally by a broadcast capable receiver, which are not accessible via the Internet, to be identified. In addition to the URL, the trigger may also include other information such as a human-readable name, an expiration date, or a descriptor. Lastly, the trigger may contain syntax that is specific to a single enhanced content programming standard. For example, Receivers 103 that are configured to utilize the ATVEF standard are typically programmed to ignore triggers that do not begin with a "<" in the first byte.

III. ATV Controller Use of Triggers

There are a variety of techniques for forcing Content Providers 105 to insert ATV Controller recognized markers with their triggers. These techniques are described in more detail below. Regardless of the technique, the use of triggers and markers allow ATV Controller 109 to monitor and control the interactions occurring between Receivers 103 and Content Providers 105. For example, ATV Controller 109 can (i) prohibit certain types of transactions, (ii) track monetary transactions, and (iii) enforce the business rules of Network Operator 101, typically by prohibiting those transactions that do not follow the designated business rules.

IV. Basic System Utilizing Content Provider Inserted Markers/Triggers

1. Initial User Interaction

Figure 2A:
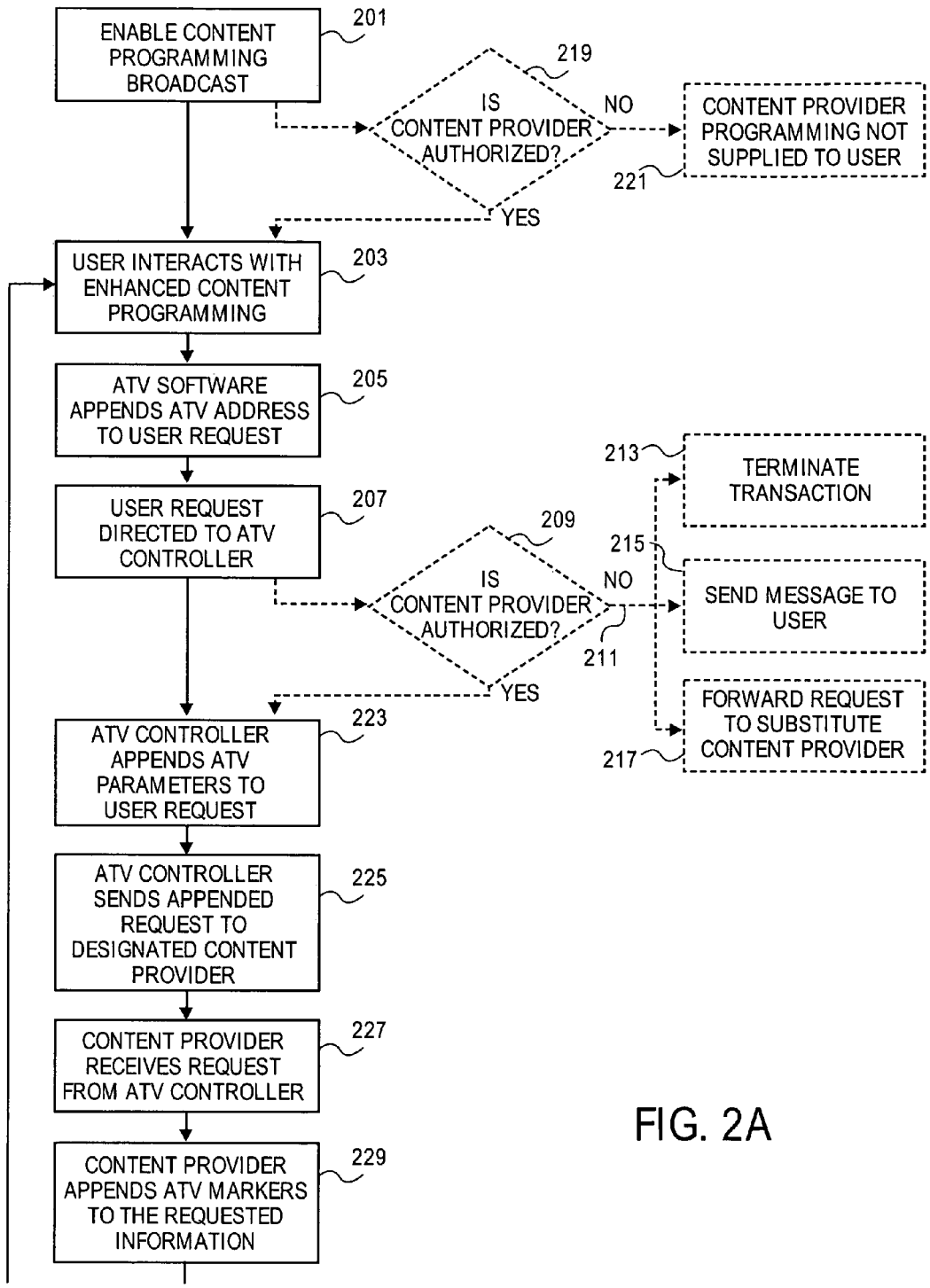

FIGS. 2A–B illustrate the method associated with a system operating in accordance with the invention. As previously briefly described, and as is well known by those of skill in the art, Content Providers 105 broadcast enhanced content programming to user Receivers 103 (step 201), either using the same system as that used by the standard programming broadcaster or using an alternate system. The enhanced content programming may be additional information and/or specifications for a topic currently being broadcast, purchasing information for a product currently being shown, polling information that allows the user to participate in a current game or event, on-demand programming/services, or other enhanced content programming. Typically the enhanced content programming is either in the form of content-synchronous data or on-demand data.

When the user, through the use of Receiver 103, interacts with the enhanced content programming (step 203), ATV software resident within device 103 appends an ATV address to the user's request (step 205) (e.g., http://local.acceleratetv.com? http://www.xyz.com/ad.tvhtml+"other pertinent information") and directs the user request to ATV Controller 109 (step 207). If desired, at this stage an authorization check can be performed to verify that Content Provider 105 designated by the specific user request is registered with or otherwise authorized by Network Operator 101 (optional step 209). If the designated Content Provider is not authorized (step 211), the transaction can be terminated (step 213), a message can be sent to the user indicating that the designated Content Provider is unauthorized (step 215), and/or the request can be forwarded to an authorized Content Provider 105 supplying similar goods or services to those provided by the originally designated Content Provider (step 217). Thus Network Operator 101 is not only given an opportunity to insure that only authorized Content Providers 105 utilize and potentially profit from its network, but it is also given an opportunity to substitute authorized Content Providers for unauthorized Content Providers.

In an alternate embodiment, each trigger associated with enhanced programming is subjected to an authorization check prior to any associated enhanced programming being supplied to the user (step 219). Preferably the ATV software resident in Receivers 103 performs the authorization check, preventing delivery of non-authorized content-synchronous data or on-demand data from being delivered to the user (step 221). ATV Controller 109 can also substitute enhanced programming from a similar, but authorized Content Provider 105. As a result of the described approach, the user is not even aware of enhanced programming that is available from non-authorized Content Providers.

An example illustrating the differences between the authorization schemes described above is as follows. During a specific music video, an unauthorized Content Provider "X" may wish to include a graphic that states "You can buy the album you're listening to now at a reduced price by pressing the 'Order Now' button on your screen." Depending upon the specifics of the user's Receiver 103, the user can "press" the displayed "Order Now" button by pressing a button on a remote or receiver; highlighting the "Order Now" button with the remote or receiver and then pressing an enter key; using a touch-sensitive screen; or by other well known means. In the first embodiment described above, if the user presses the "Order Now" button, the user will not be able to place an order with the designated Content Provider 105. In order to maintain user satisfaction, ATV Controller 109 can respond to the user's request by displaying a message such as "Unable to complete transaction because Content Provider X is not registered with your Network Operator." Alternately, ATV Controller 109 can connect the user with an alternate, and authorized, Content Provider 105 that offers the same or similar product/service. In the second embodiment described above, the user would not have received the graphic from the unauthorized Content Provider, and would therefore be unaware of the lost purchasing opportunity. As noted, ATV Controller 109 can also substitute programming from a similar, but authorized Content Provider.

The "other pertinent information" in the ATV address noted above can include information on the specification and capabilities of Receiver 103. Therefore this information can be used to insure that the format of the enhanced programming is suitable for the specific Receiver (e.g., set-top box attached to a television, a PDA with a touch-screen, etc.). Alternately, the "other pertinent information" in the ATV address can provide specific user information (e.g., a user profile) that allows ATV Controller 109 to tailor the enhanced programming. For example, the "other pertinent information" may include the user's geographic location. Using this information, ATV Controller 109 can insure that the information provided to the user is for a "local" distributor of the Content Provider. Alternately, if ATV Controller 109 provides services to multiple geographic regions as well as a variety of different Network Operators 101, the "other pertinent information" in the ATV address can provide the information necessary to insure that the ATV Controller provides the appropriate information for a given network, region, level of service, etc.

After ATV Controller 109 receives a request from a Receiver 103, it appends various ATV parameters to the relayed request (e.g., http://www.xyz.com/ad.tvhtml?"accelerate parameters") (step 223). The "accelerate parameters" can include specifications of Network Operator 101 and/or Receiver 103, user profile information, business and/or technical rules (e.g., the required look and feel of the Content Provider's display), etc. ATV Controller 109 then relays the request for additional information or other interaction from Receiver 103 to the designated Content Provider 105 (step 225), assuming that if an authorization check was undertaken, the results were positive.

Content Provider 105 receives the information from ATV Controller 109, including the appended ATV parameters (step 227). Content Provider 105 appends ATV markers to the requested information (step 229) and sends the information to Receiver 103 (step 231). ATV Controller 109 detects the triggers or markers inserted within the returned information which pertain to the specifics of the interaction (e.g., code for a purchased item) (step 233), thus allowing the Controller to monitor the transaction. ATV Controller 109 stores, depending upon the requirements of Network Operator 101, some or all of the monitored transaction information (step 235). For example, in the preferred embodiment, ATV Controller 109 is used to monitor financial transactions occurring between Receivers 103 and Content Providers 105. Accordingly, data on user purchases or other financial transactions are directed into ATV memory 111. Alternately, this information can be directed into a memory resident within the Network Operator system (e.g., memory 113).

The end user, via Receiver 103, is presented with the requested enhanced content programming (i.e., the requested information) from Content Provider 105 (step 237). Typically at this stage the user decides whether or not to proceed with the interaction (step 239). If the user elects to terminate the interaction, they preferably return to standard programming (step 241). Alternately, the user can elect to proceed with the interaction, for example by selecting to purchase the product or service presented by Content Provider 105 (step 243). It is understood that at this juncture, depending upon the type of interaction between the user and the Content Provider, other options may be available. For example, the user may request additional information (e.g., product specifications, available colors, models, etc.) on a displayed product at this time (step 245), resulting in a new request for information being sent to the Content Provider (step 246). Examples of other reasons for additional user requests include polling interactions, refining the initial user request, etc. When the user requests additional information, ATV Controller 109 continues to monitor the transaction and, to at least a limited extent, continues to direct the flow of information to and from the Receiver 103 and the designated Content Provider 105. During these subsequent interactions, it is typically no longer necessary to confirm that the designated Content Provider 105 is an authorized Content Provider.

In the preferred embodiment, when the user elects to purchase a product or service, i.e., step 243, their purchase is entered into a "Shopping Cart" which is under the control of ATV Controller 109 (step 247). At this time the user is not required to finalize their purchase. Rather, the user is only required to initialize the purchase or other transaction. Since the user is not required to complete the transaction immediately, spontaneous purchases are encouraged.

As ATV Controller 109 tracks each transaction (e.g., each initialized purchase), in the preferred embodiment after the user has initialized a purchase, thus causing the purchase to enter into the Shopping Cart, ATV Controller 109 requests additional information from the designated Content Provider 105 (step 249). This information may include the stock keeping unit or SKU, additional product descriptions and specifications, pictures, videos, stock information, tax and delivery information, etc. Preferably ATV Controller 109 requests this information immediately upon entry of a purchase into the user's Shopping Cart, thus insuring that the information is immediately accessible by the user. Once ATV Controller 109 has obtained the additional information from the designated Content Provider 105, the information is stored for later retrieval (step 251) either in ATV memory 111 or Network Operator memory 113. In an alternate embodiment, the system is configured to obtain this information (i.e., step 249) during a period of low system usage (e.g., between 3 and 4 a.m. each day). In this configuration, if the user enters into the Shopping Cart and requests the additional information prior to the system entering into this low usage period, the ATV Controller 109 immediately requests the additional information from the Content Provider.

In at least one embodiment of the invention, ATV Controller 109 periodically requests updated information from each designated Content Provider 105 (step 253). An example of information that is periodically updated is status information (e.g., back-order dates, expected shipping dates, updated delivery schedules, etc.). ATV Controller 109 updates the information maintained in storage so that the user can obtain the latest information whenever desired.

2. Shopping Cart

Figure 3:
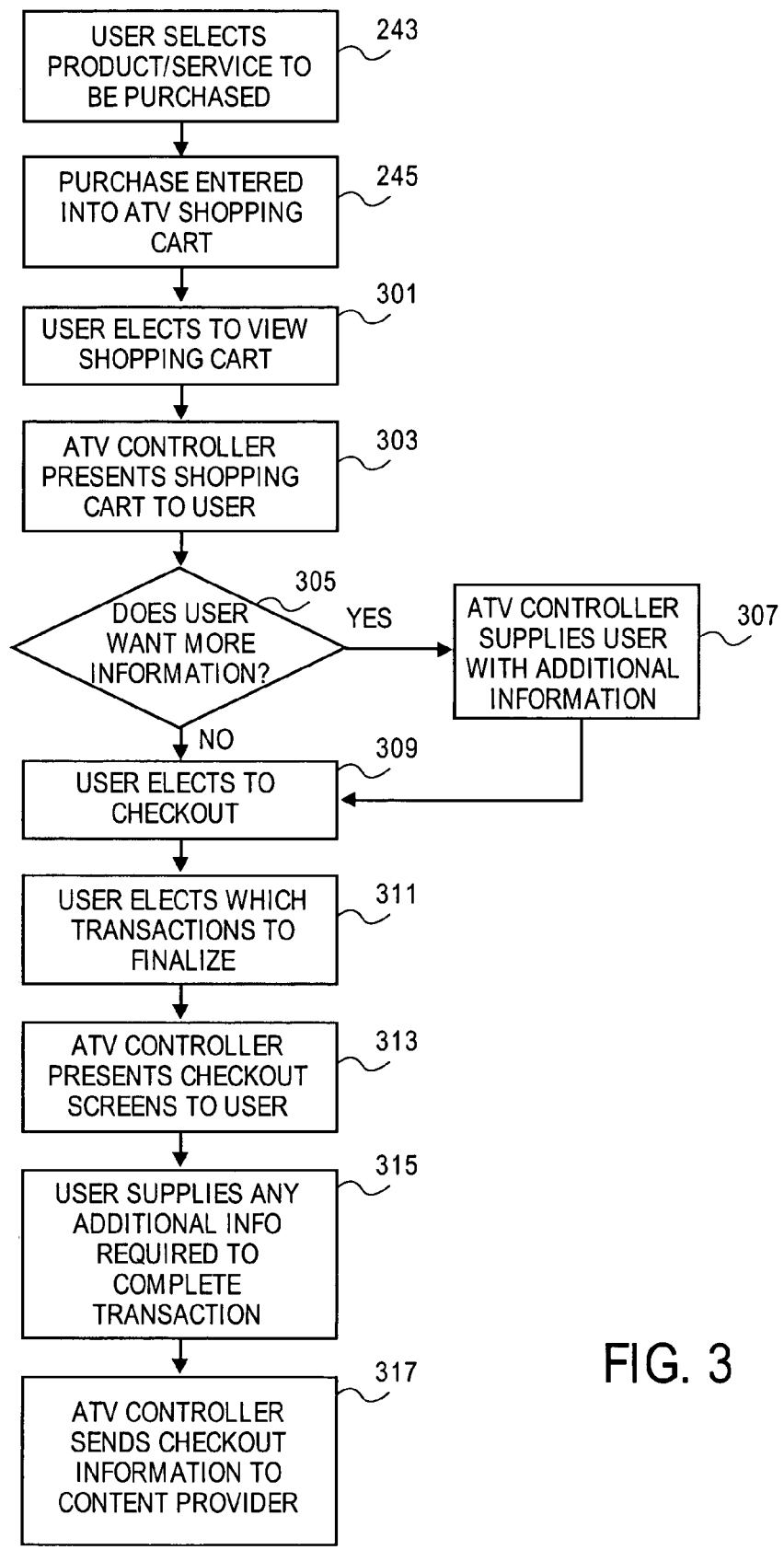
FIG. 3 illustrates the method of interaction with the ATV Shopping Cart.

FIG. 3 illustrates the method of interacting with the ATV Shopping Cart. As previously described, when a user elects to purchase a product or service (step 243), their purchase is entered into a Shopping Cart particular to that user (step 245). As ATV Controller 109 monitors all transactions that take place between the user and any Content Provider 105, the Shopping Cart preferably is configured to provide the user with information about all purchases or other financial transactions particular to that specific user for a given period of time. Tracked information can include the total number of transactions, total running price, purchases to date, etc.

At some point in time, the user elects to view the Shopping Cart (step 301). The user may make this election at the time that a purchase or other financial transaction is initialized, or at a subsequent time (e.g., at the end of a conventional program, at the end of the day, etc.). Once elected, ATV Controller 109 presents the Shopping Cart to the user via the user's Receiver 103 (step 303). The look of the Shopping Cart depends upon the system configuration which is primarily driven by the requirements of the Network Operator 101 and the limitations/capabilities of Receivers 103. Typically the Shopping Cart will be comprised of multiple data screens designed to relay the required information in an easily navigable format. Although the Shopping Cart screen or screens can replace the standard programming screen, in the preferred embodiment whenever the Shopping Cart option is activated, some or all of the standard programming is still available on a portion of the user's screen (e.g., TV screen if Receiver 103 is coupled to a TV, display screen if Receiver 103 is coupled to a PDA, etc.). The Shopping Cart information is presented on the remaining portion of the user's screen. Alternately, the Shopping Cart information can be presented in a semi-transparent overlay, thus allowing the user to view the underlying programming while still interacting with the Shopping Cart.

As previously described, ATV Controller 109 maintains a data base containing pertinent information on each item or transaction within the Shopping Cart. The user may elect to view the additional information for any particular product or transaction (step 305), preferably by highlighting the product or transaction within the Shopping Cart and indicating that they want additional information (for example, by "pressing" an "additional info." button within a Shopping Cart menu). ATV Controller 109 then supplies the user with the requested additional information (step 307). In some instances, for example in order to provide the user with the latest delivery schedule, ATV Controller 109 will have to contact the designated Content Provider 105 and request an update to the information in question. In addition to receiving supplemental product/service information via the Shopping Cart screens, preferably the user can update user profiles, alter the transaction (e.g., changing quantities), supply authorization codes if required, etc.

In the preferred embodiment, the initial Shopping Cart screen shows more information than simply the identity of the goods or services that have been ordered. Preferably the initial Shopping Cart screen also indicates the purchase price, whether the purchase has been finalized, and general status information (e.g., back-order dates, expected shipping dates, updated delivery schedules, etc.).

In the preferred embodiment of the invention, when a user wishes to finalize a purchase, i.e., "checkout", they "push" an appropriate button on the Shopping Cart, thereby notifying ATV Controller 109 of their desire (step 309). The user can checkout with or without requesting additional information about the goods or services in question. Additionally, the user can select either to finalize all pending transactions or some subset thereof contained within the Shopping Cart (step 311). As ATV Controller 109 continually tracks all of the interactions that occur between a specific Receiver 103 and each Content Provider 105, the user is able to checkout at any time.

When the user indicates that they wish to checkout, they are presented with one or more checkout screens (step 313). Assuming that ATV Controller 109 contains information on the geographic location of the user, the specifications of the particular Receiver 103, the specifications of Network Operator 101, etc., ATV Controller 109 formats the checkout screen(s) to match the requirements of the Network Operator and the Receiver.

In at least one embodiment of the invention, the checkout process is completely under the control of ATV Controller 109. In this embodiment the user interacts with ATV Controller 109, through Receiver 103 and Network Operator 101, to provide whatever additional information may be required to complete the checkout process (e.g., purchase quantities, model numbers, color, mode of delivery, etc.) (step 315). As required, ATV Controller 109 interacts with the designated Content Providers 105 (step 317), for example to place the order, update delivery dates, etc. In this embodiment ATV Controller 109 acts as a conduit between the end user and the Content Provider, for example by providing billing information from the user (or from the user's profile) to the Content Provider and providing delivery and status information from the Content Provider to the end user.

In an alternate embodiment, the system is configured to allow some or all of the control of the checkout process to be under the control of Network Operator 101, as required by the Network Operator. In this embodiment ATV Controller 109 monitors the data stream for triggers or markers and acts as a conduit between the end user and Network Operator 101, forwarding information requests as well as request responses. Network Operator 101 controls the transaction, providing billing, shipping, and other information to the Content Provider and delivery, status, and other information to the end user via Receiver 103.

In yet another alternate embodiment, Network Operator 101 (or alternately, ATV Controller 109) acts as a "bank" for the user's transactions. In this embodiment when the user, via a Receiver 103, makes a purchase, funds for the purchase are transferred to the designated Content Provider 105 directly from the Network Operator 101 (or alternately, ATV Controller 109). The user's account with the Network Operator is then charged for the transaction. In addition, typically the user's account is charged a surcharge for the service, either a flat rate or a percentage of the transaction cost. Preferably in this embodiment rather than simply charging the user's account, thus risking user delayed payment or non-payment, the user's profile contains the information required to allow immediate billing of the user's credit card.

3. Transaction Tracking

A benefit of ATV Controller 109 monitoring all transactions between a Receiver 103 and the various Content Providers 105 is that Network Operator 101 can use the information to control the quality of its Content Providers. As a result, user satisfaction for the services provided by the Network Operator is improved. Thus, for example, if Network Operator 101 becomes aware that a specific Content Provider is routinely delaying delivery of purchased goods or services or otherwise dissatisfying users, the Network Operator can use its clout (e.g., the threat of eliminating the Content Provider's authorization to provide enhanced content programming on the Operator's network) to rehabilitate the Content Provider.

Network Operator 101 can use the information obtained by ATV Controller 109 pertaining to user transactions in a variety of ways. For example, Network Operator 101 can charge each Content Provider 105 a fee based on the total number of transactions (e.g., purchases) that take place over its network for a given period of time. Alternately, Network Operator 101 can base this fee on the transactional costs, the profits realized by the Content provider, or by other means. Alternately, Network Operator 101 can charge the users a fee based on the total number of transactions, financial or otherwise, between the user and any Content Provider. Alternately, Network Operator 101 can charge the users a fee based on the total purchase costs for all financial transactions occurring over its network between the user and all Content Providers. It is understood that these are but a few of the business models that Network Operator 101 can employ to obtain revenues based on the monitored transactions.

The transaction data obtained by ATV Controller 109 and preferably presented via the Shopping Cart allows users to not only track individual purchases/transactions, but also to track purchases/transactions by individual Content Provider 105, type of good or service, period of time, etc. Thus the user is able to obtain valuable information about their own buying patterns, thereby allowing them to maintain financial budgets, etc.

4. User Profiles

Although the primary function of ATV Controller 109 is to monitor interactions, financial or otherwise, between each Receiver 103 and each Content Provider 105, it can also be used to simplify the purchase of goods and services. In the preferred embodiment, ATV Controller 109 maintains pertinent purchasing information for each user, either storing this information in ATV memory 111 or memory 113 coupled to Network Operator 101. This information can be cataloged either by Receiver or by individual user, thus allowing each user within a "family" of users, all of which connect to the system via a single Receiver 103, to maintain an individual profile.

In the preferred embodiment, the minimum profile for each Receiver 103 and/or user includes both shipping information (e.g., shipping address, preferred carriers, etc.) and billing information (e.g., credit card information, billing address, etc.). Additional information such as preferred airlines, frequent flyer numbers, car rental preferences and participant I.D. numbers, hotel preferences and participant I.D. numbers, etc. can also be included in the profiles.

In addition to simplifying the checkout process, the user profile can also be used to enforce budgets, control the hours in which enhanced programming is accessible, enforce parental controls, etc. For example, during a music video a trigger can be sent from an authorized Content Provider 105 in a content-synchronous data stream, the trigger causing an icon to be generated on the user's screen indicating that for a limited time the user can purchase a CD by the same musician for a reduced price. The user can indicate their desire to purchase the offered CD and immediately return to the music video, ATV Controller 109 tracking their request to purchase the CD and matching this request with the appropriate trigger. At some later time (e.g., after the video ends; prior to changing channels; prior to turning off the system; at the end of the day, week, or month; etc.) the user can enter the Shopping Cart and decide whether or not to complete the transaction. Preferably ATV Controller 109 has already obtained additional information about the product from the designated Content Provider 105, for example, the CD running time, shipping costs, the rating of the CD (e.g., excessive profanity), etc. Within the user's profile the user can include information pertaining to any or all of this information, for example the ratings. Then, on the basis of the rating (or other characteristic) and the user's previously entered profile, ATV Controller 109 can allow the transaction to move forward, void the transaction, or request additional information. The requested additional information can include authorization to continue, for example by including a password or PIN number in the transaction request. By controlling the password, PIN number, or other authorization code a parent, guardian, or other authority can control the transactions, including purchases, permitted on a specific Receiver 103. Similarly, a password, PIN number, or other authorization code can be used to control all transactions or any predefined subset of transactions, thus allowing the user to enforce rules associated with their Receiver 103 (e.g., budgets, ratings, etc.).

V. System Utilizing ATV Software Resident Within Receivers

Figure 4:
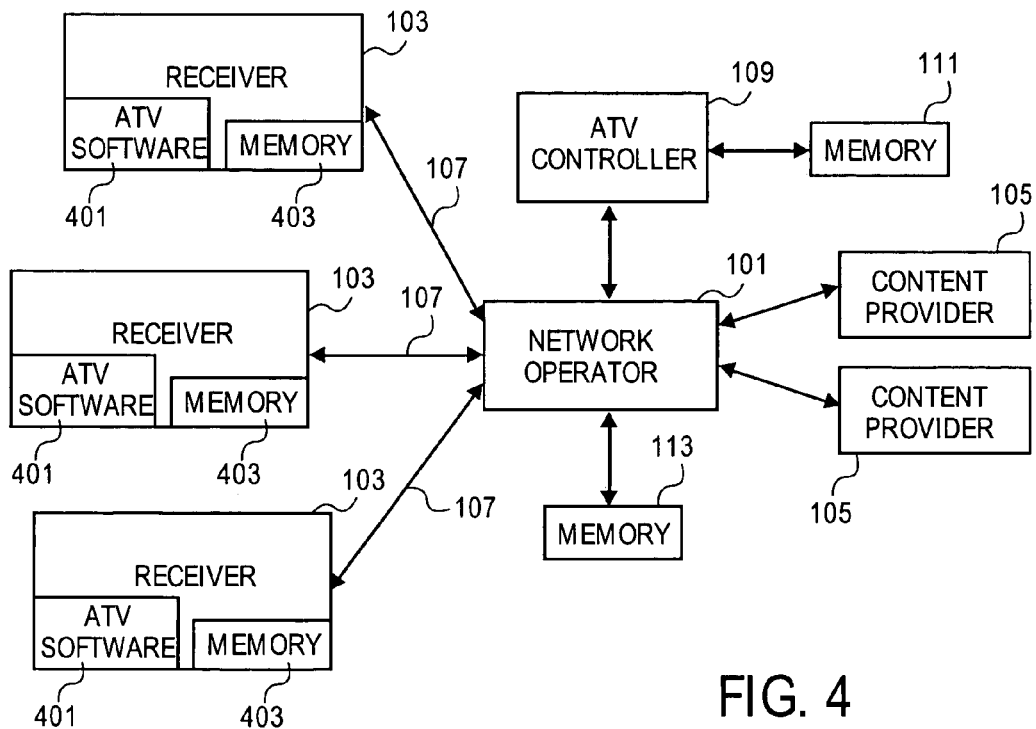
FIG. 4 is a schematic illustration of the system utilizing ATV software resident in the individual receivers.
Figure 5A:
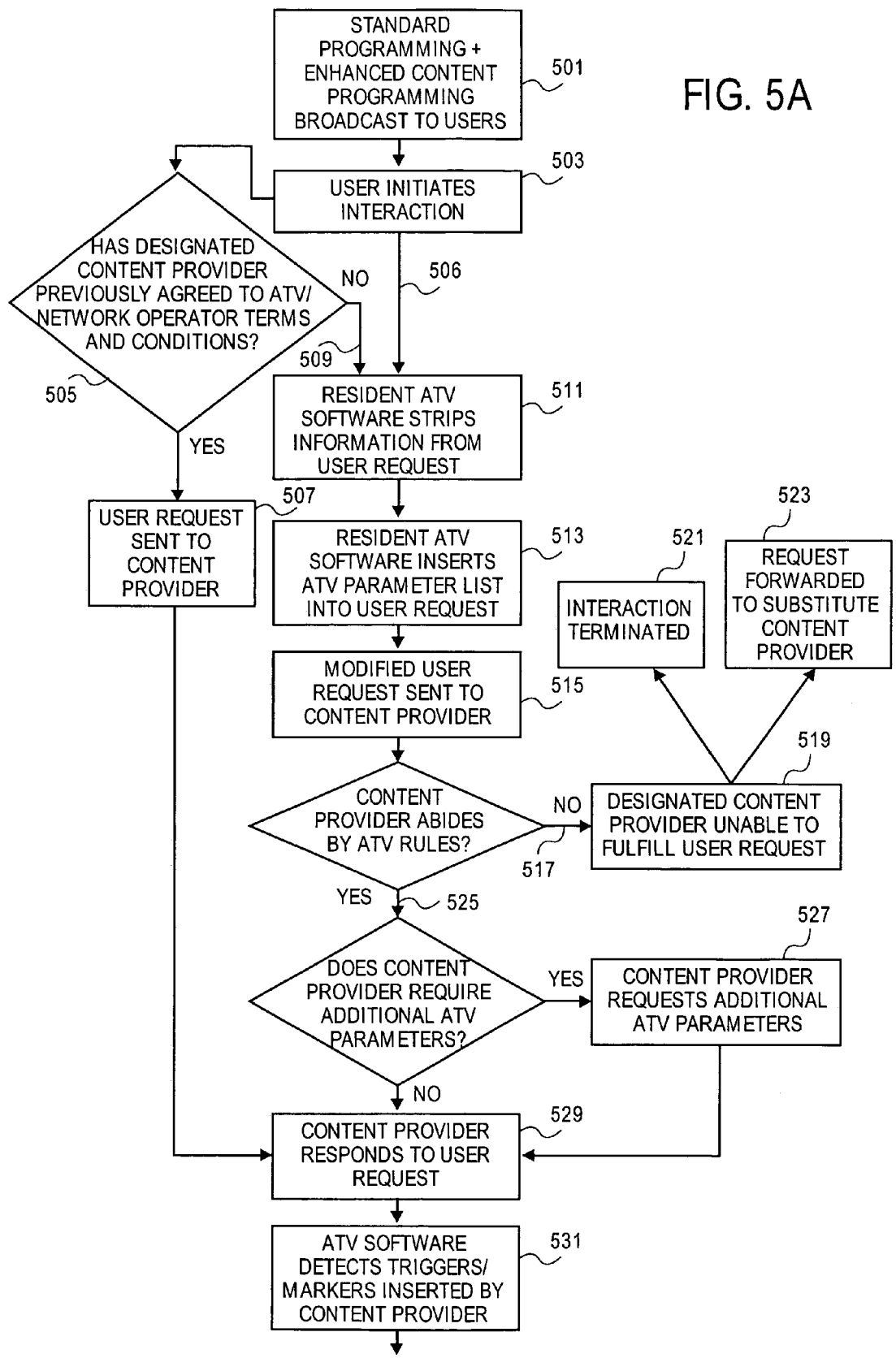
FIGS. 5A–B illustrate the method associated with the embodiment shown in FIG. 4.
Figure 5B:
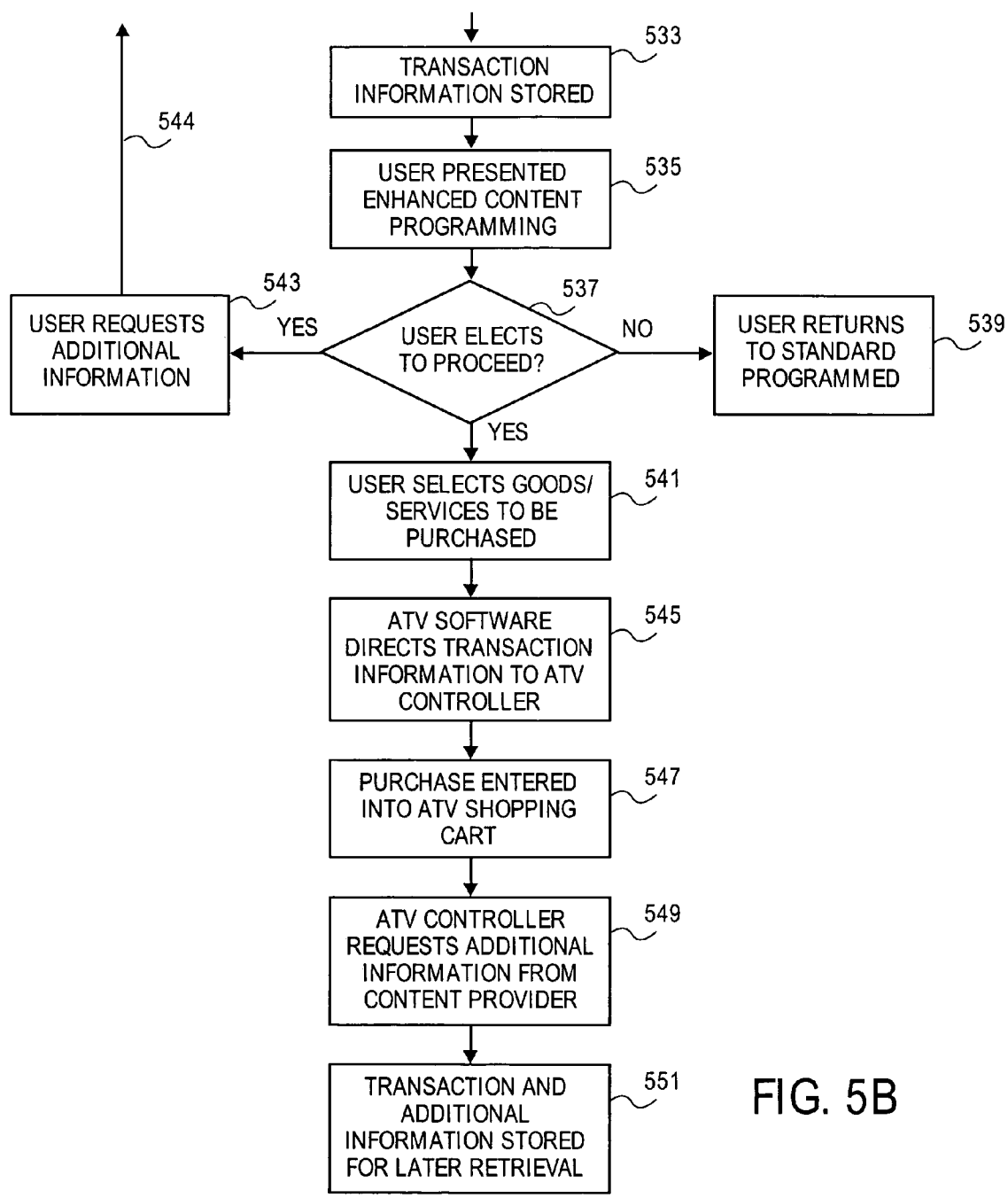

FIG. 4 is a schematic illustration of a system according to the invention in which a portion 401 of the ATV software is resident within each receiver 103. Except as noted below, this system operates in a similar manner to that described in Section IV above. FIGS. 5A–B illustrate the method associated with this embodiment.

Initially Receivers 103 receive standard programming as well as enhanced content programming provided by various Content Providers 105 (step 501). The enhanced content programming can be content-synchronous programming or on-demand programming. When the user, via Receiver 103, initiates an interaction with a designated Content Provider 105 (e.g., request for additional information, request to purchase a product or service, request for on-demand programming, etc.) (step 503), preferably resident ATV software 401 first determines whether or not the designated Content Provider 105 has previously agreed to abide by the terms, conditions, and other requirements set by ATV Controller 109 and Network Operator 101 (step 505). This determination can be made by comparing the designated Content Provider 105 to a list of authorized Content Providers 105, recognizing an ATV marker inserted by the Content Provider into the enhanced content data stream, or by other means. Alternately, each transaction-initiating request can be treated in the same way (i.e., step 506), thus by-passing Content Provider authorization verification step 505.

If ATV software 401 verifies that the designated Content Provider 105 is an authorized Content Provider, then ATV software 401 forwards the user's request to the designated Content Provider (step 507). If the designated Content Provider 105 is not an authorized Content Provider (step 509), or if the Content Provider authorization verification step is skipped (step 506), resident ATV software 401 strips some or all of the information from the user's request (step 511). Sufficient information must be stripped from the user's request to prevent designated Content Provider 105 from fulfilling the user's request without the aid of ATV Controller 109 and/or ATV resident software 401. Preferably the identity of the requesting Receiver is stripped while passing the particulars of the user's request.

In addition to simply stripping out information from the user's request, ATV resident software 401 inserts an ATV parameter list (step 513) to the user's request. The ATV parameter list includes ATV address information as well as particular requirements of the system (e.g., business rules required by Network Operator 101, specification and configuration information about the requesting Receiver 103, etc.). Once modified, the user request is sent to the designated Content Provider 105 (step 515).

If designated Content Provider 105 decides not to abide by the requirements set by the ATV Controller 109 via resident ATV software 401 (step 517), the interaction between the designated Content Provider 105 and the requesting Receiver 103 is not allowed to proceed by resident ATV software 401 (step 519). ATV software 401 prevents this interaction by (i) not providing the designated Content Provider 105 with the identity of the requesting Receiver 103; (ii) providing insufficient request information to the designated Content Provider 105; or (iii) intercepting information from the designated Content Provider 105 before it passes to requesting Receiver 103. At this stage the interaction is terminated (step 521). Preferably once the original interaction is terminated, the user's initial request is forwarded to another Content Provider 105 authorized to offer similar goods or services (step 523). In this scenario ATV software 401 contacts ATV Controller 109 with the user's request. ATV Controller 109 then forwards the request to a suitable substitute Content Provider 105.

If the designated Content Provider 105 agrees to the terms and/or requirements set by ATV Controller 109 via ATV software 401 (step 525), the Content Provider 105 may be required to request additional information from ATV Controller 109 (step 527) prior to proceeding with the user interaction, assuming that the required information is not included in the ATV software's initial attachment to the user's request. Such additional information may be required ATV protocols, formal agreement to ATV Controller 109 and Network Operator 101 terms and conditions, etc.

After the protocols and ATV Controller requirements have been agreed upon by the designated Content Provider 105, the designated Content Provider 105 responds to the initial user request, providing the requested enhanced programming (step 529) to the requesting Receiver 103. As required by ATV Controller 109 and/or ATV software 401, Content Provider 105 appends ATV markers to the supplied enhanced programming. ATV software 401 detects the triggers or markers inserted within the returned information which pertain to the specifics of the interaction (e.g., code for a purchased item) (step 531), thus allowing the transaction to be monitored. Depending upon the requirements of Network Operator 101, at this point some, all, or none of the monitored transaction information is stored (step 533). For example, data on user purchases or other financial transactions are preferably stored in memory. This information can be stored in memory 403 within Receivers 103, directed into ATV Controller memory 111, or directed into Network Operator memory 113.

The end user, via Receiver 103, is presented with the requested enhanced content programming (i.e., the requested information) from Content Provider 105 (step 535). Typically at this stage the user decides whether or not to proceed with the interaction (step 537). If the user elects to terminate the interaction, they preferably return to standard programming (step 539). Alternately, the user can elect to proceed with the interaction, for example by selecting to purchase the product or service presented by Content Provider 105 (step 541). It is understood that at this juncture, depending upon the type of interaction between the user and the Content Provider, other options may be available. For example, the user may request additional information (e.g., product specifications, available colors, models, etc.) on a displayed product at this time (step 543), resulting in a new request for information being sent to the Content Provider (step 544). Examples of other reasons for additional user requests include polling interactions, refining the initial user request, etc. When the user requests additional information, ATV software 401 continues to monitor the transaction and, to at least a limited extent, continues to direct the flow of information to and from the Receiver 103 and the designated Content Provider 105.

In the preferred embodiment, when the user elects to purchase a product or service, i.e., step 541, ATV software 401 directs ATV Controller 109 (step 545) to enter the purchase data into the ATV Shopping Cart (step 547). As in the prior embodiment, ATV Controller tracks the transactions, requesting additional information from the Content Provider as required (step 549), and storing that information for later retrieval (step 551). Preferably the ATV Shopping Cart performs in a similar manner to that described with reference to the prior embodiment.

VI. System Utilizing Data Filtering

Figure 6:
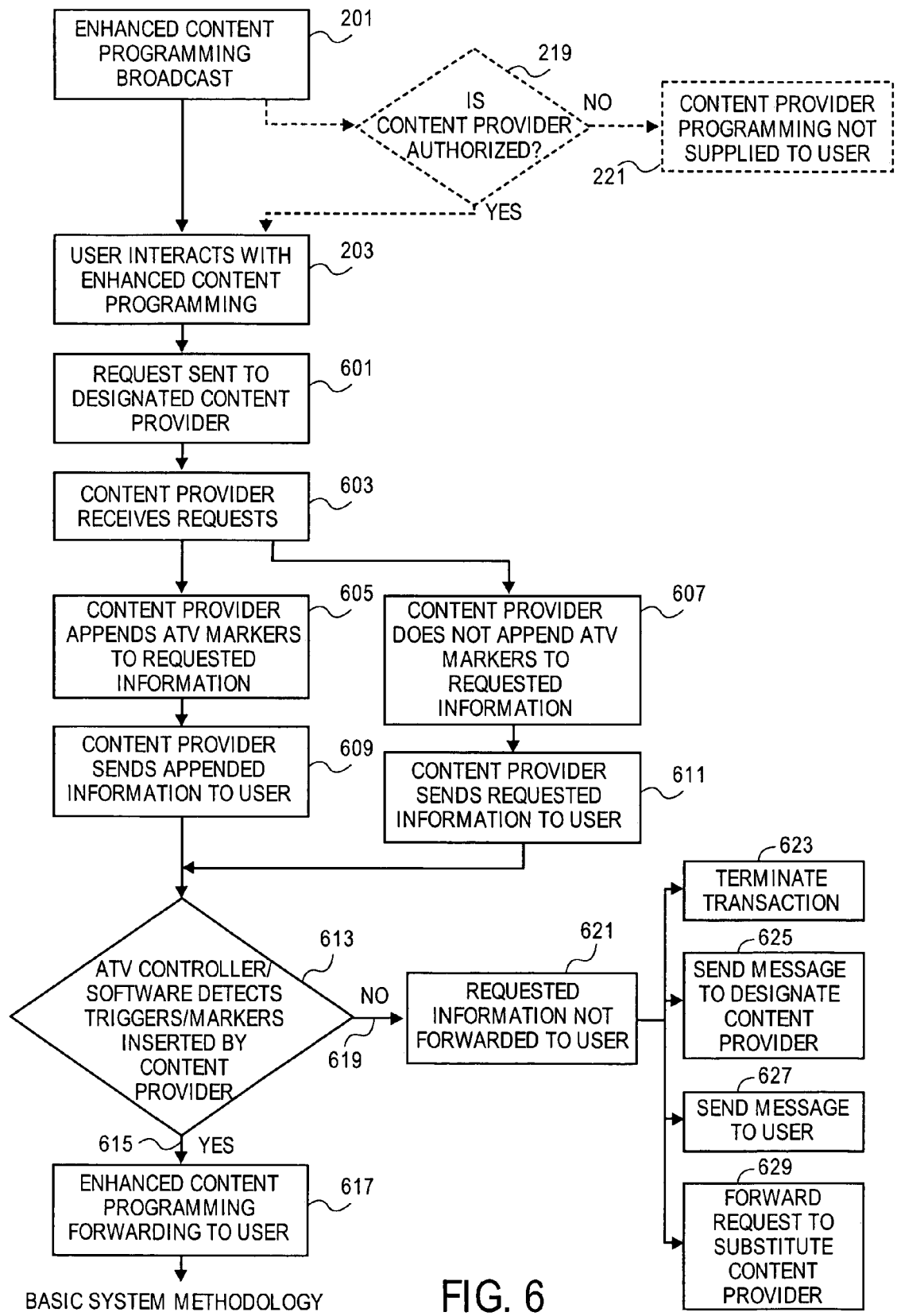
FIG. 6 illustrates an alternate embodiment of the invention.

FIG. 6 illustrates an alternate embodiment of the invention. Except as noted below, this embodiment operates in a similar manner to that described in Section IV above.

Initially Content Providers 105 broadcast enhanced content programming to users via Receivers 103 (step 201) using a variety of techniques either previously described or well known by those of skill in the art. Although not preferred, at this stage either ATV Controller 109 or ATV software 401 can perform an authorization check (step 219) to insure that only authorized enhanced content programming is made available to the user. Preferably Content Provider authentication is not performed until after the user has indicated a desire to interact with a specific Content Provider.

When the user, through the use of Receiver 103, interacts with specific enhanced content programming (step 203), a request is sent to the designated Content Provider 105 (step 601). After receiving this request (step 603), the designated Content Provider can either choose to append ATV markers to the requested information (step 605) or not (step 607). The Content Provider can obtain instructions for the ATV markers through an open Application Program Interface or API, through direct communication with either the ATV Controller administrator or the Network Operator, or through other means.

The designated Content Provider 105 then sends the requested information back to the user, either with the appended ATV markers (step 609) or without the appended ATV markers (step 611). ATV software, either resident within Receiver 103 (e.g., ATV software 401) or within ATV Controller 109, reviews the enhanced content programming (step 613). If the enhanced content programming contains the necessary ATV markers (step 615), the requested information is forwarded to the user (step 617). From this point on, the method is the same as previously described with reference to FIGS. 2A–B (i.e., steps 239–253).

If the required ATV markers are not included in the programming (step 619), the requested information is not forwarded to the user (step 621). At this juncture there are several options that can either be used singularly, or in combination with each other. The simplest option is to terminate the transaction at this time (step 623). Given that the designated Content Provider may be unaware that they must append certain ATV markers in order to interact with the requesting user, preferably a message is sent to the designated Content Provider 105 (step 625), explaining that their information has not been forwarded to the requesting party because they have not complied with the requirements set forth by the Network Operator 101 and the ATV Controller 109. This message also preferably includes directions as to how to obtain the required instructions (e.g., through an open API). Thus in this scenario the designated Content Provider 105 is given an opportunity to resend the requested information with the required ATV markers. If the designated Content Provider 105 still refuses to follow the ATV protocol, a message is preferably sent to the user informing them that the designated Content Provider 105 is unauthorized and therefore the requested information will not be provided (step 625). Alternately, this message can immediately be sent to the user, thus not providing the Content Provider with a chance for rehabilitation. Lastly, if the Content Provider is unwilling to include the necessary ATV markers, the user request can be forwarded to a substitute Content Provider offering a similar good or service (step 629).

VII. API Information

In order to improve implementation of the above-described embodiments, preferably Content Providers 105 are given access to an API. The API provides the necessary framework to allow a Content Provider to properly interface with ATV Controller 109 and/or ATV software 401.

In one embodiment of the invention such as that illustrated in FIGS. 1–3, any Content Provider 105 that wishes to provide enhanced content programming to a Receiver 103 coupled to a Network utilizing an ATV Controller 109 obtains the ATV API. The API may be provided upon execution of a suitable agreement between the Content Provider 105 and the Network Operator 101 and/or ATV Controller 109. Alternately the ATV API may be readily available, for example via an Internet Web site.

After obtaining the ATV API, the Content Provider 105 responds to any requests for enhanced content programming by following the ATV API requirements, including providing any required ATV routing directions as well as any required transaction information (e.g., SKU numbers, delivery information, etc.). ATV Controller 109 fills-in any additional information that the API requires pertaining to the specifics of Receivers 103 and Network Operator 101.

In an alternate embodiment of the invention such as that illustrated in FIGS. 4 and 5, when a user first initiates a request for enhanced content programming, ATV software 401 strips the request of certain information and appends a parameter to the request alerting Content Provider 105 to use the ATV API format for their transactions. This request is then forwarded to the designated Content Provider. Assuming that the designated Content Provider affirmatively responds to the request, the Content Provider provides transaction information (e.g., SKU numbers), routing information, and any other pertinent information that is necessary to complete the requested transaction. As the API includes routing information, the response by the Content Provider is routed to ATV software 401 resident within the initiating user's Receiver 103. ATV software 401 then fills-in any final information needed by the API such as specifics of the initiating user's Receiver 103, information regarding the user's geographical region, business rules required by Network Operator 101, etc.

In at least one embodiment, the ATV API requires Content Providers 105 include a marker (e.g., meta-tag, comment line tag, etc.) in any and all information sent to a Receiver 103. This embodiment is particularly well suited for information that is HTML-, XML-, or other code-based. The ATV API detects the type of markers and how they are to be used. For example, the markers can be used to represent the type of transaction (e.g., information only versus financial), the location of delivery information, the location of product specifications, the location of the Content Provider (e.g., for calculating taxes and delivery costs), etc. Upon receipt of the enhanced content programming, ATV software 401 or ATV Controller 109 parses the programming on the basis of the markers. If necessary, and as previously discussed, ATV software 401 or ATV Controller 109 can add information to the enhanced content programming such as business rules, geographic regions, etc.

VIII. Additional Embodiments

As described above and shown in FIGS. 1–6, the preferred embodiment of the invention provides a method and system for enforcing the business rules of a Network Operator, monitoring the interactions between users and those Content Providers utilizing the Network Operator's system, and allowing a user to initiate a transaction at one point in time and configure and finalize the transaction at a much later point in time, thus promoting impulse transactions. These same systems can also be used to implement other desirable features, either in conjunction with the preferred embodiment or as an alternative to the preferred embodiment.

1. Profiling

As previously described, user profiles are preferably used in order to simplify the checkout process as well as to enforce budgets or other controls. Additionally, profiles can be used to provide improved service to both the users and the Content Providers.

Figure 7:
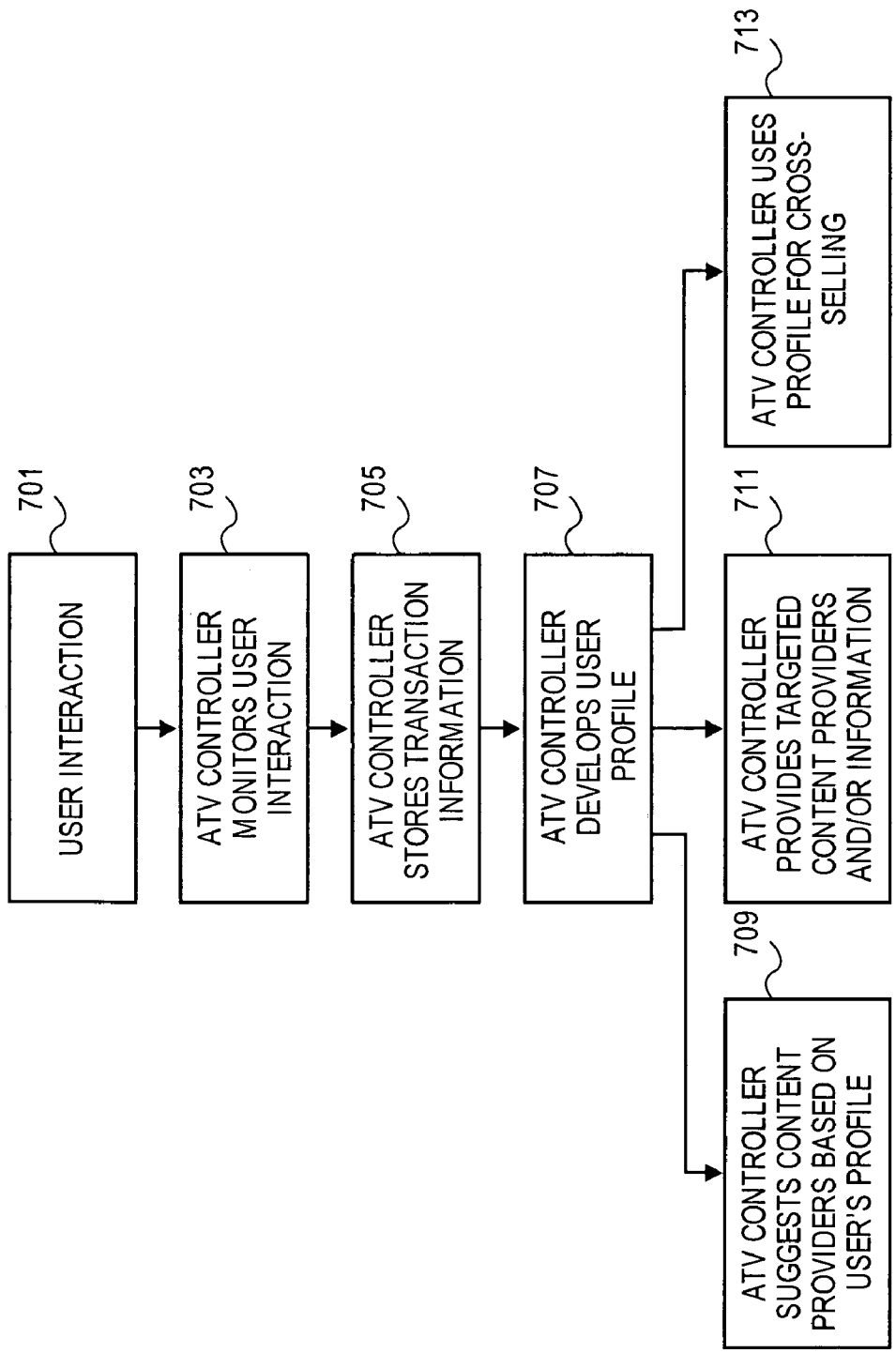
FIG. 7 illustrates alternate applications for user profiles.

For example, as illustrated in FIG. 7, each time a user via a particular Receiver 103 interacts with a Content Provider 105 (step 701), ATV Controller 109 monitors (step 703) and stores (step 705) information about the transaction. The information to be stored is typically based on criteria set by ATV Controller 109, by Network Operator 101, by the user, or by some combination thereof. Criteria can include, for example, the category of purchased good or service (e.g., home electronics, furniture, clothing, jewelry, CDs, videos, health related items, food related items, etc.), the number of items purchased, the per item cost, the total cost per purchase, etc. Additionally, the user profile can be based on all transactions, including those that are initiated but never finalized, or only on those transactions that conclude with a purchase by the user. Lastly, the user profile can be based, in whole or in part, on profile information submitted by the user (e.g., user interests, user income, etc.).

In the preferred embodiment, the user profile is automatically and continuously updated, thus allowing the user profile to be continuously refined as the system gathers more information. After a preset number of transactions have occurred, ATV Controller 109 develops a user profile (step 707). Although a user profile can be developed based on a single transaction, preferably more than a single transaction is required to develop the user profile (e.g., 5, 10, 25, 50, or more transactions).

Once developed, the user profile can be used in numerous ways, depending upon the requirements set by the Network Operator and the ATV Controller. In one embodiment, ATV Controller 109 presents the user with suggested Content Providers 105 based on the user's profile (step 709). Thus if a user is watching a music video and the user's profile indicates that they have repeatedly purchased CDs on-line in the past, ATV Controller 109 can suggest several Content Providers to the user, each of which provides on-line CD purchasing opportunities. Alternately, ATV Controller 109 can suggest on-demand programming for a music concert or other music related programming. Alternately, once a Content Provider initiates a transaction with a user (e.g., offering a product for sale), ATV Controller 109 can present the user with alternate Content Providers 105 based on the user's profile. As a consequence of this approach, the user is provided with expanded purchasing opportunities and the ability to comparison shop.

In an alternate embodiment, ATV Controller 109 presents the user with Content Providers 105 and/or information from a specific Content Provider 105 that is specifically targeted to the user's profile (step 711). For example, a specific Content Provider may be offering a food supplement. If a user's profile indicates that the user is interested in sports, the information provided by the Content Provider may stress how the food supplement can improve a person's reflexes and strength. Alternately if the user's profile indicates an interest in weight control diets and programs, the information provided by the same Content Provider may stress how the food supplement can be used to augment a weight loss program.

In an alternate embodiment, the developed user profiles are used for cross-selling purposes. Accordingly, in this embodiment ATV Controller 109 couples a specific user, based on that user's profile, with various Content Providers 105 (step 713) that provide a good or service that is related to one or more criteria in the user's profile but which may or may not specifically match the criteria. For example, the user's profile may indicate that the user often purchases CDs while watching music videos. Based on this information, ATV Controller 109 may suggest a Content Provider that sells T-shirts with the names, pictures, etc. of various musical artists, rock groups, etc. Consequently, the user is presented with a purchasing opportunity that would not have been otherwise presented. Additionally, the suggested Content Provider is provided with a selling opportunity that it might not have had otherwise and which is more likely to conclude with a successful sale given the user's demonstrated interest in related goods.

2. Branding

The present invention provides numerous opportunities for branding, i.e., placing a specific brand, trademark, logo, product or service name, etc. within view of the potential user or purchaser of the good or service. Although branding provides many benefits to the brand's owner, its primary benefit is the development of name recognition, potentially leading to increased sales. For example, when a consumer goes to a store with the intent of buying an appliance and finds similar appliances by three different manufacturers, the consumer is more likely to purchase the recognized brand.

One technique of branding that can be implemented with the present invention is through the use of the Shopping Cart. As previously described, the Shopping Cart can replace the standard programming screen, utilize only a portion of the standard programming screen, or utilize a semi-transparent overlay. Regardless of the technique used to provide the Shopping Cart, ATV Controller 109 can dedicate a portion of the Shopping Cart screens to branding. For example, ATV Controller 109 can locate a banner above or below the main Shopping Cart screen which conveys brand information, the brand information being either static or dynamic in nature. Besides brand information, linking information to specific Content Providers that offer the branded goods or services can also be provided (e.g., CD branding plus linking information for Content Providers through which the user can purchase the CD). Additionally, the Content Providers themselves may utilize branding to improve their own name recognition.

In at least one embodiment of the invention, the branding service is coupled to the previously described user's profile. Thus, for example, the brands displayed via a specific Receiver 103 are selected by ATV Controller 109 for that specific Receiver based on the profile of the user. For instance, if the user's profile indicates that the user watches music videos and purchases CDs on-line, the selected brands can relate to specific musicians, newly released CDs, Content Providers through which the user can purchase CDs, etc. Alternately, if the user's profile indicates that the user primarily watches sports and often purchases on-demand sports broadcasts, ATV Controller 109 can provide banners relating to on-line sports ticket brokers, sports memorabilia for sale, future on-demand sports broadcasts, etc.

In addition to providing branding benefits to Content Providers and profile related linking benefits to users, the use of branding in the present invention provides a valuable revenue generating resource to Network Operator 101. As opposed to only obtaining revenues from the sale of network services to users and/or the sale of the authorization to provide enhanced content programming via its network to Content Providers, the present invention allows revenues to be generated based on branding.

3. Picture-in-Picture Viewing

Picture-in-picture (PIP) televisions are currently available which provide the user with the opportunity to simultaneously view two (or more) independent screens. They utilize either multiple on-board tuners, or a single on-board tuner with the capability of coupling additional tuners to the system. Alternately, a television or monitor can be coupled to an external receiver (e.g., set-top box, satellite receiver, etc.) in order to provide the user with PIP capabilities. The benefit of a PIP system is that it allows the user to monitor multiple events simultaneously (e.g., a baseball game and a football game).

In accordance with at least one embodiment of the invention, the PIP feature is used to provide the user with standard programming in one screen (e.g., the principal screen) and enhanced content programming in a second screen (e.g., the PIP). For example, a user could watch a baseball game being broadcast via standard programming along with an on-demand boxing match delivered via enhanced content programming.

Preferably, the enhanced content programming is related by subject matter to the standard programming and is provided automatically by ATV Controller 109. For example, while watching a cooking show, ATV Controller 109 can couple Content Providers to the PIP which offer cooking supplies. Alternately, as opposed to relating the enhanced content programming to the standard programming under view, ATV Controller 109 can provide enhanced content programming which corresponds to the user's profile. Thus in the above example, if the user's profile indicates that the user frequently purchases jewelry on-line, even when the user is viewing the cooking show, they are still receiving enhanced content programming relating to jewelry (e.g., Content Providers 105 that offer jewelry on-line).

It is understood that the enhanced content programming supplied to the user may be comprised of a variety of information types. For example, if ATV Controller 109 is configured to provide enhanced content programming that relates to the user's profile, and a particular user's profile indicates an interest in nature related activities and goods, the enhanced content programming may include nature movies/documentaries, home shopping opportunities for camping/hiking gear, and related shopping opportunities (e.g., gardening supplies).

4. Trigger Filtering

As previously described, triggers and other types of markers routinely accompany enhanced content programming and other types of data streams. These triggers can be used to provide a resource locator, an indicator of resource availability, a resource content identifier, a Content Provider indicator, etc. In the preferred embodiment of the invention, triggers are used to monitor enhanced content programming, thus providing a means for the Network Operator to monitor and control interactions between a Content Provider 105 and a Receiver 103. The triggers or markers can also be used in a variety of other ways, both in conjunction with, and separate from, the basic invention, as described further below.

i) Source Control

Figure 8:
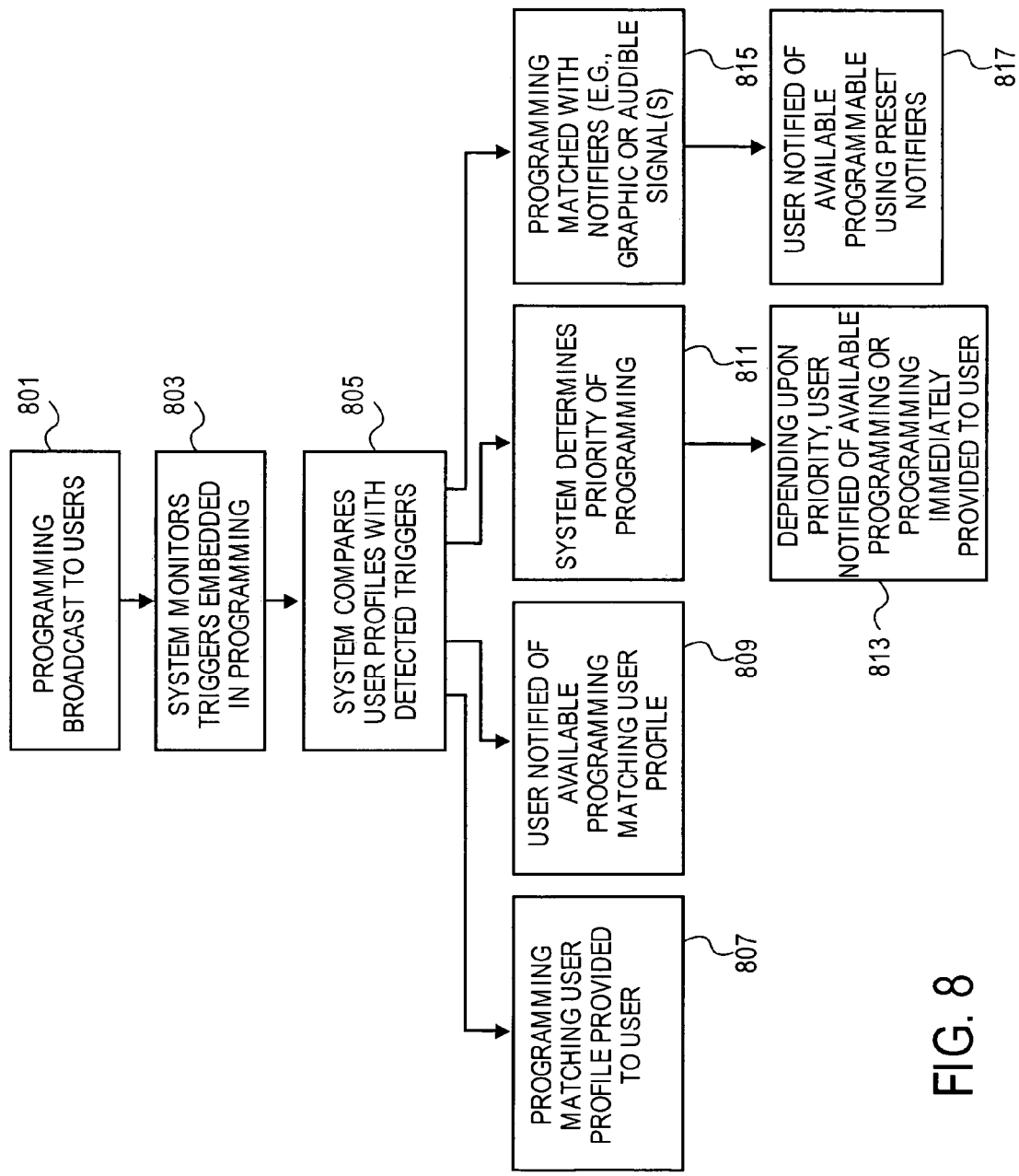
FIG. 8 illustrates a method of trigger filtering.

In an embodiment illustrated in FIG. 8, each Receiver 103 receives a stream of source information from a variety of sources including Content Providers 105, on-demand programming, standard programming, etc. (step 801). The source information can include, for example, special events (e.g., an on-demand presentation of a boxing match, etc.), news (e.g., headline news, world news, local news, etc.), sports (e.g., games, scores, sports news, etc.), business (e.g., business news, stock quotes, etc.), movies, etc. Associated with each information source is a trigger that identifies the type of information provided. Preferably there are also triggers that identify subcategories for each type of information. For example, within sports there may be a trigger associated with each type of sport (e.g., baseball, football, etc.).

In this embodiment the triggers are used to filter from the stream of source information that material which is of particular interest to the user, as determined by a set of explicit or implicit preferences (steps 803 and 805). For example, the user's preference may be for sports. Additionally, the user may refine their preferences to football, and even more specifically, to a particular football team. Based on these preferences or criteria, the system can be configured to operate in one of several ways. First, any information that fits within any user specified criteria can be provided to the user. This information can be provided immediately upon receipt of a trigger associated with the desired information (step 807). Alternately the user can be notified that information matching their preset criteria is currently available (step 809), for example by presenting an icon in the corner of the user's television screen, thus allowing the user to decide whether or not they wish to view the information. Second, any information that matches all user defined criteria (i.e., in the above example, sports+football+particular team) can be provided to the user, either immediately upon receipt or through the previously described notification process. Third, the user can specify priorities associated with each preset criterion (steps 811 and 813). For example, the user could specify that they wish to be notified if a football game is available, but their current programming should be interrupted with any news involving their favorite team (e.g., game, scores, draft picks, etc.). Fourth, associated with each type of source information or each type of specifiable criterion is a particular on-screen graphic or audible signal, thus allowing the user to distinguish between different types of information (steps 815 and 817). The on-screen graphic or audible signal can be preset or user defined. For example, if the user's filtering criteria is comprised of stock quotes, sports scores, and a particular baseball team, suitable on-screen graphics include a dollar sign, a scoreboard, and the baseball team's logo, respectively. Accordingly, when a graphic appears on the user's television screen, they can decide if they wish to tune to the source information associated with the graphic.

In an alternate embodiment, the system controller based on the user's profile sets the user preferences or criteria. Preferably the user is given an opportunity to review and modify the system set criteria. Once set, the criteria can be used in any of the ways described above.

ii) Audio Triggers

As previously described, triggers and other types of markers routinely accompany enhanced content programming and other types of data streams. These triggers may be transparent to the user, for example the trigger may simply provide a locator tag so that the data source can be located if selected. Alternately, the trigger may be used to provide an indication that a specific program, enhanced content, or other information is available for viewing. In this instance, typically the trigger causes an on-screen graphic to appear, thereby notifying the user of the availability of the specific information. The Content Provider, the broadcaster, or the Network Operator typically sets the on-screen graphic which may be comprised of a simple icon (e.g., an "i" in the corner of the screen), or something representative of the type of available information (e.g., a "News 5" icon representing a news broadcast associated with a particular channel).

In an alternate embodiment, associated with each trigger or with certain types of triggers (e.g., program availability triggers) is an audible signal. The audible signal can be in addition to, or as a replacement for, an on-screen graphic. The audible signal can be set to make a single signal, for example when a specific enhanced content program is first available. Alternately, the audible signal can be set to repeatedly signal the arrival of the trigger, the frequency of the signal being adjustable by the Network Operator, the user, or both. The signal can be set to repeat until either the information associated with the trigger is no longer available or until the user disables the audible signal.

Preferably the audible signal can be set, either by the Network Operator or the user, such that it is only associated with a specific type of trigger. For example, the audible signal may be set to only indicate triggers associated with a specific Content Provider, a specific type of programming, or with some other trigger parameter. Additionally multiple audible signals can be used, each representing a different trigger parameter.

iii) Dynamic Replacement of Specific Content Utilizing Triggers

This embodiment of the invention provides Network Operator 101 with additional revenue opportunities. Specifically, this embodiment allows programming such as advertisements to be replaced with alternate programming, preferably at a rate which is beneficial to the Network Operator.

As previously noted, triggers and/or other types of markers can be used to indicate a change of programming. For example, during a standard broadcast program, the broadcaster typically periodically interrupts the program to allow the insertion of one or more advertisements. Although these advertisements are a revenue source to the broadcaster, typically the Network Operator does not directly receive advertising revenues.

Figure 9:
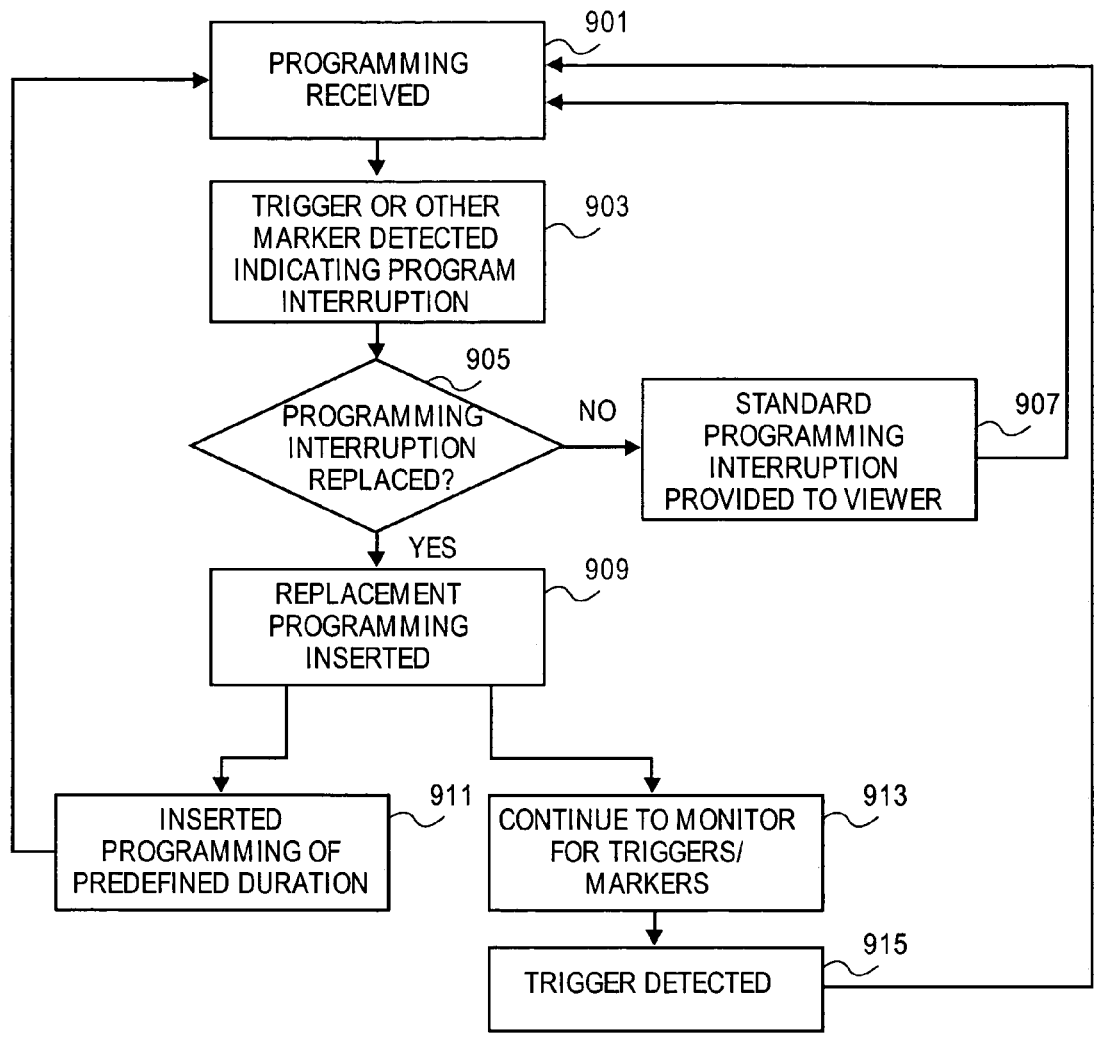
FIG. 9 illustrates a method of replacing programming interruptions.

The method of this embodiment is illustrated in FIG. 9. As shown, initially the user receives standard programming via the system of Network Operator 101 (step 901). This programming may be broadcast programming, pay-per-view programming, on-demand programming, or other programming. Periodically a trigger or other marker is detected that indicates the beginning of a program interruption (step 903), such as that commonly used for one or more advertisements and broadcast station information (e.g., station identification, station promotions, etc.). This program interruption may be detected directly by Network Operator 101 or by ATV Controller 109. Once an interruption is detected, the system determines whether or not to replace the program interruption provided by the broadcast programmer with a different program interruption (step 905), for example a program interruption (e.g., advertisement) provided by a Content Provider 105 that has entered into a financial arrangement with Network Operator 101.

If the originally arranged interruption is not replaced (step 907), the standard programming continues until the next interruption is detected. If a replacement program is inserted at the detected interruption (step 909), the system must then determine how long the inserted program (e.g., inserted advertisement) may run before returning to the original broadcast programming. This can be accomplished in several different ways. For example, the inserted program can be of a predefined duration (e.g., 15 seconds, 30 seconds, 45 seconds, etc.) with the expectation that the originally planned programming interruption is of a similar duration (step 911). As a result of this approach, the user may view a portion of the original interruption or may miss a portion of the standard programming. In the preferred approach, after the replacement programming has been inserted, either Network Operator 101 or ATV Controller 109 continues to monitor for additional triggers which signal that the standard programming is about to resume (step 913). Once such a trigger has been detected (step 915), the system switches back to standard programming. In order to achieve the desired timing, preferably the last portion of the replacement programming may be suspended at any of a variety of times. For example, the last 60 seconds of the replacement programming can be comprised of a series of ten, independent, programming promotions, thus allowing the replacement programming to end at any of a number of times without alerting the viewer that they have been watching replacement programming.

In addition to the above configuration, this system can be used to accomplish other Network Operator objectives. For instance, this system can be used to give a specific Content Provider the opportunity to focus the information that they provide. Thus, for example, a nationally recognized Content Provider 105 may purchase a 30 second commercial break in a baseball game that will be broadcast in both northern and southern California. By utilizing triggers, Network Operator 101 can monitor for this particular Content Provider's commercial. When the appropriate trigger is detected, a commercial focused on the northern California viewers can be broadcast in northern California while a commercial focused on the southern California viewers can be broadcast in southern California. This approach is particularly well suited for Network Operators that have a large network, such as that associated with satellite broadcasting.

iv) Trigger Bookmarks

A common problem associated with the use of content synchronous data, on-demand data, and other data streams provided to a user during the course of normal system usage (e.g., television, internet, etc.) is that the user is often required to interrupt their current use in order to review the enhanced content programming. For example, a trigger can be used to provide an indicator to a television viewer that additional information is available about the topic currently being presented. The additional information can be detailed specifications, costs, availability, background information, etc. Although the user may wish to view some or all of this additional information, they may be reluctant to do so if it requires them leaving the present programming. Unfortunately, such additional information is typically tied with the programming under view and therefore may be unavailable at a later time when viewing may be more convenient to the user.

Figure 10:
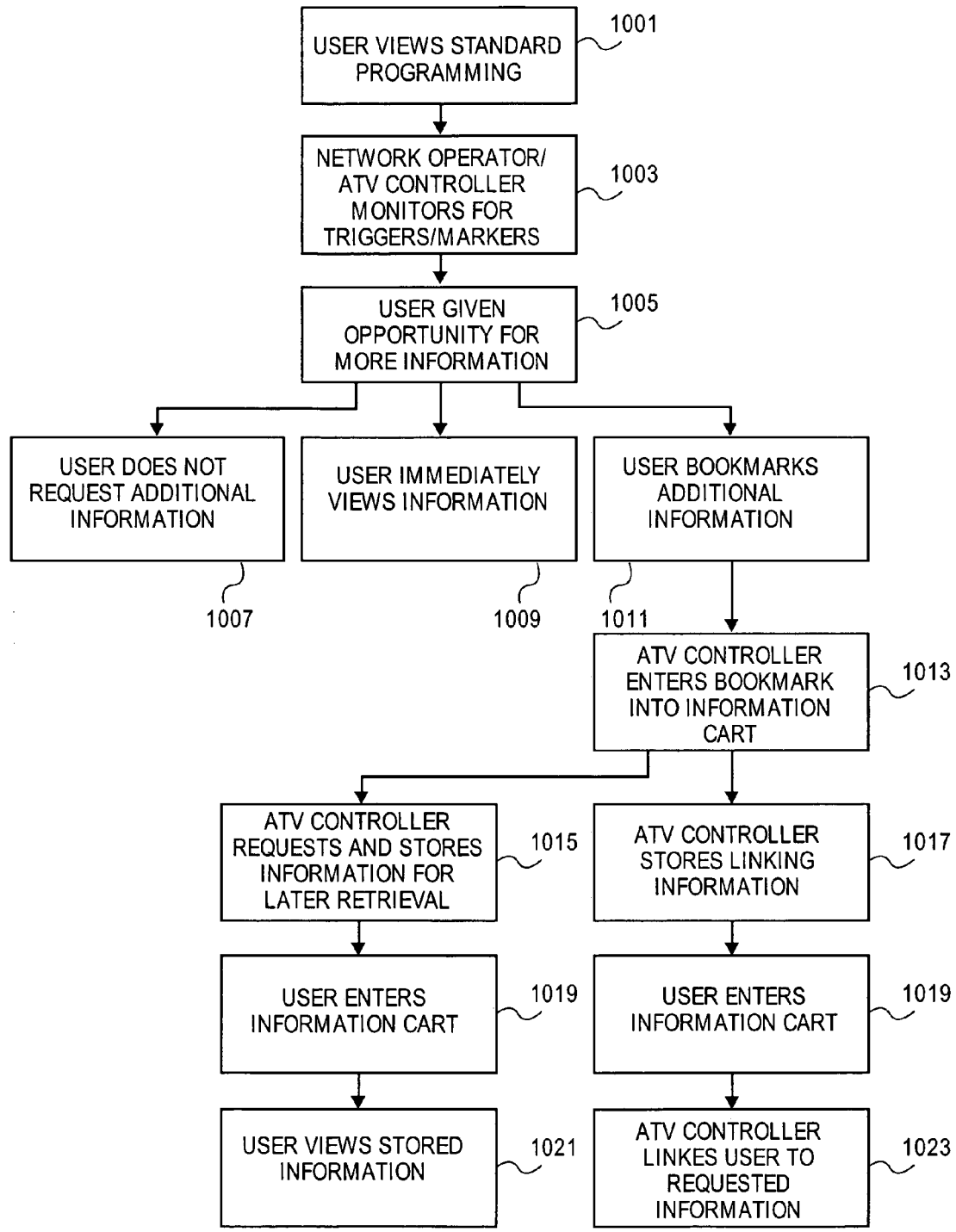
FIG. 10 illustrates a method of bookmarking.

One embodiment of the invention overcomes these problems by allowing the user to "bookmark" the additional information for later viewing. As shown in FIG. 10, initially the user is viewing some form of standard programming (step 1001). For example, the user may be viewing a conventionally broadcast program, an on-demand program, an information program provided by a Content Provider 105, or some other form of program. While the user is viewing the standard programming, Network Operator 101 or ATV Controller 109 monitors for triggers or other markers (step 1003). When the user is presented with the option of obtaining additional information (step 1005), for example via a graphical identifier, audible identifier, or other means, the user can opt to receive no additional information (step 1007), immediately receive additional information (step 1009), or simply bookmark the additional information for later viewing (step 1011).

If the user bookmarks the additional information, ATV Controller 109 enters the bookmark into an ATV Information Cart (step 1013). Depending upon the system configuration, ATV Controller either places the requested information into memory (e.g., memory 111 or 113) for later viewing (step 1015) or simply copies the required linking information into memory (step 1017). At a later time (e.g., during a later portion of the programming or at some time after completion of the programming) the requesting user enters the ATV Information Cart (step 1019). Depending upon the system configuration, the user either is presented with the stored information (step 1021) or automatically linked to the stored information (step 1023).

Figure 11:
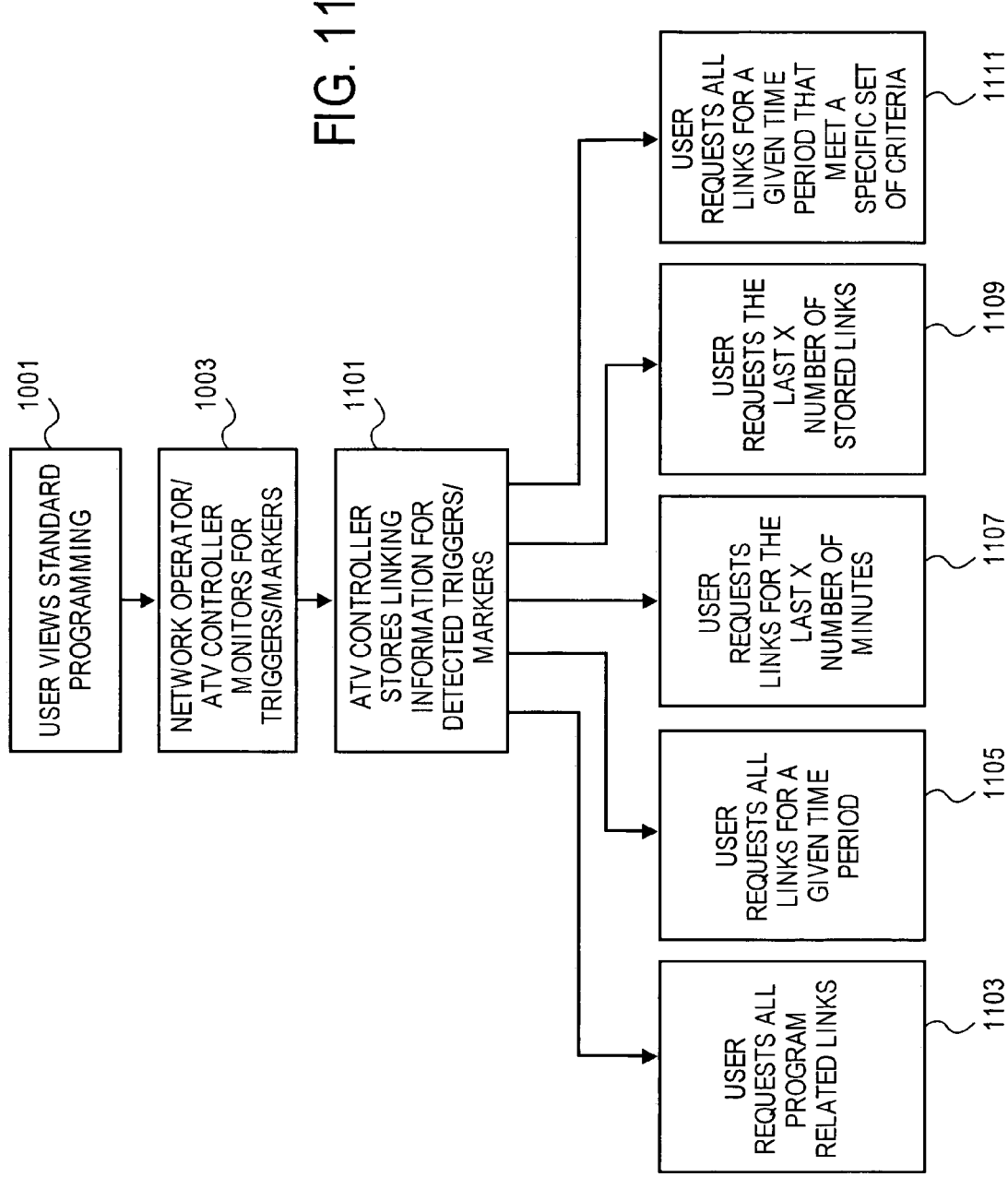
FIG. 11 illustrates a method of obtaining links to past triggers.

In an alternate embodiment illustrated in FIG. 11, although the user does not actively bookmark information for later viewing, they are able to request this information at a later time. In this embodiment as in the previously described embodiment, ATV Controller 109 continuously monitors for triggers (step 1003). Whenever a trigger is detected, suitable linking information is stored in memory (e.g., memory 111 or 113) (step 1101). In order to limit the memory required, typically linking information is only stored for a limited time. At a later point in time, the user is able to request this information by requesting all links associated with a specific program (step 1103), all links recorded for a given time period (step 1105), all links recorded for the last 'x' number of minutes (step 1107), the last 'x' number of stored links (step 1109), or all recorded links for a given time period that meet certain filtering criteria (e.g., channel, format, information type, etc.) (step 1111).

v) Cross Channel Trigger Filtering

In a typical embodiment of the invention, ATV Controller 109 monitors triggers that are located within data streams that accompany the channel being viewed. As previously described, these triggers can then be used to monitor user/Content Provider transactions, provide novel branding and cross-selling opportunities, allow information bookmarking, etc. Additionally, and in accordance with at least one embodiment of the invention, the monitored triggers need not be associated with the data streams that accompany the channel being viewed.

Figure 12:
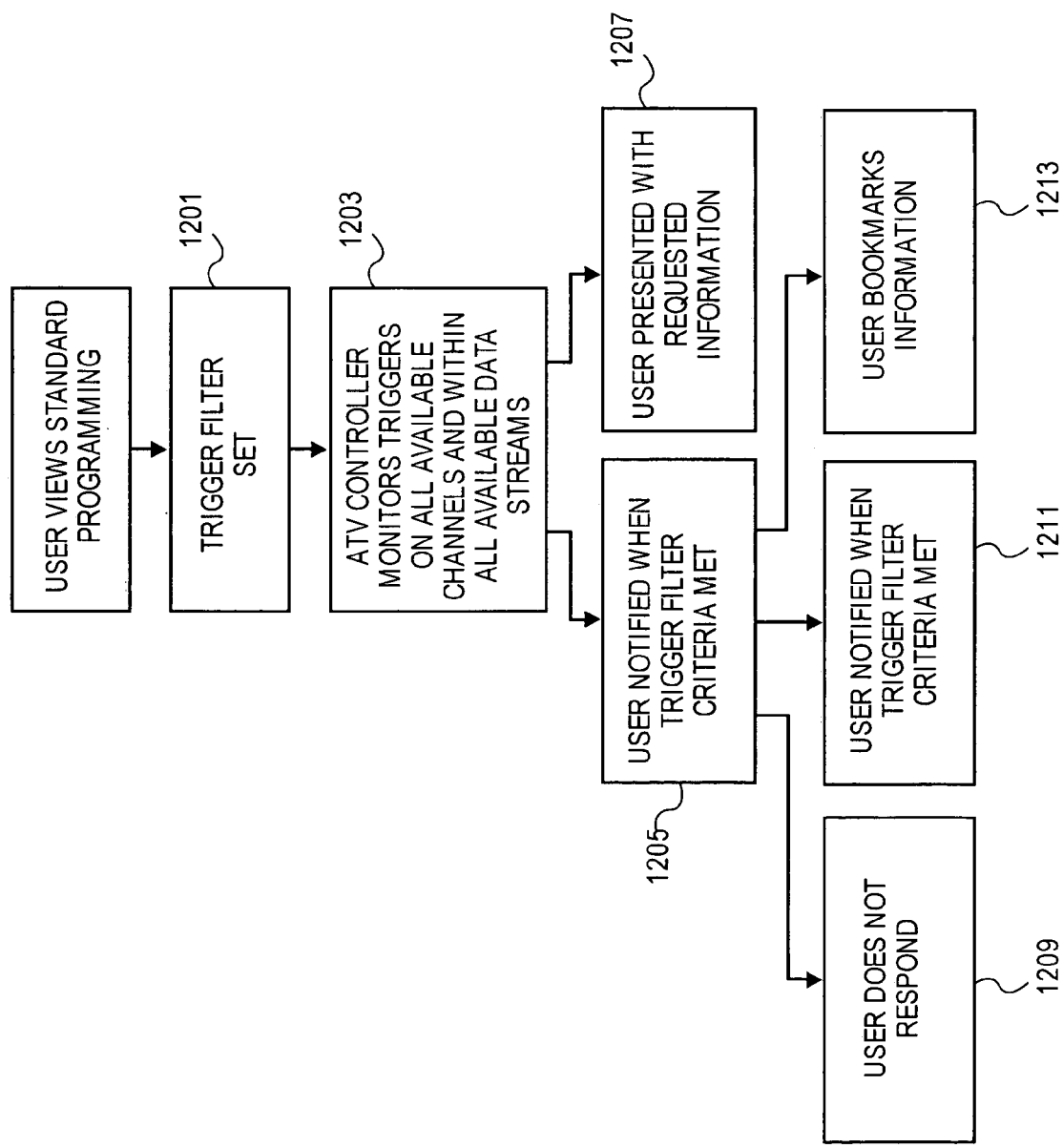
FIG. 12 illustrates a method of cross channel trigger filtering.

In at least one embodiment of the invention, as illustrated in FIG. 12, a trigger information filter is defined (step 1201), either explicitly by the user or implicitly by the user's profile. Preferably the information filter is explicitly set, thus allowing the user to change the filter frequently depending upon current needs. Once set, ATV Controller 109 monitors all possible sources, including both those associated with the channel being viewed and those associated with other channels, for triggers meeting the criteria (step 1203). Once a trigger meeting the criteria is detected, the user is notified (step 1205), typically using a screen graphic or an audible signal. Alternately, the system can be configured to immediately present the user with any information meeting the preset criteria (step 1207).

If the system is configured to merely notify the user of the arrival of a trigger meeting the pre-defined criteria, the user may respond in one of several manners. First, the user can simply ignore the information and continue viewing the current programming (step 1209). Second, the user may immediately request to be provided with the information (step 1211). Third, the user may bookmark the information for later viewing (step 1213). Preferably if the user immediately views the information (either via step 1207 or step 1211), the requested information is provided as a semi-transparent screen overlay or dominates only a portion of the screen.

The primary benefit of this embodiment is that it allows the user the ability to monitor multiple data streams while primarily focussing on a single data stream. For example, the user may be watching an on-demand movie while trying to keep abreast of a breaking news story (e.g., an international crisis, a major sporting event, etc.). Utilizing this embodiment of the invention, the user is able to enjoy the on-demand movie, knowing that if any information becomes available on the desired topic, they will immediately be informed.

It is understood that the criteria for the filter (step 1203) may be comprised of a variety of different types of information. For example, in addition to simply defining the topic of interest (e.g., draft choices for a local football team), the user may also wish to only monitor certain channels (e.g., a local channel, a headline news service, a sports broadcast service, etc.) and certain information types (e.g., news). The user may also wish to set the media type (e.g., standard broadcast programming, Web based information, etc.).

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of controlling a network transaction between a user receiver and a content provider occurring over a network operated by a network operator, the content provider offering enhanced content programming relating to the network transaction, the method comprising the steps of:

initiating a request for the enhanced content programming, said request initiated by the user receiver and directed at the content provider via the network, wherein the enhanced content programming includes enhanced television signal permitting user interactivity;

intercepting the request for enhanced content programming, said intercepting step performed by a third party;

appending information to the request for enhanced content programming, said appending step performed by the third party;

transmitting the appended request for enhanced content programming to the content provider, said transmitting step performed by the third party;

directing the enhanced content programming responsive to said appended request at the user receiver via the network, said directing step performed by the content provider;

intercepting the enhanced content programming, said intercepting step performed by the third party and determining whether the enhanced content programming includes markers inserted by the content provider in response to information appended by the third party to the request;

determining if the enhanced content programming complies with a set of third party parameters by examining the markers;

permitting the enhanced content programming to be received by the user receiver if the enhanced content programming complies with said set of third party parameters; and preventing the enhanced content programming from being received by the user receiver if the enhanced content programming does not comply with said set of third party parameters.

2. The method of claim 1, wherein said set of third party parameters is comprised of a set of business rules.

3. The method of claim 1, wherein said set of third party parameters include the requirement of embedding a third party marker within the enhanced content programming.

4. The method of claim 1, wherein said preventing step further comprises the step of transmitting a set of third party requirements to the content provider.

5. The method of claim 1, wherein said preventing step further comprises the step of directing said request to a substitute content provider.

6. The method of claim 1, wherein said set of third party parameters includes a set of receiver capabilities.

7. The method of claim 1, wherein said set of third party parameters includes a user profile associated with the user receiver.

8. The method of claim 1, wherein said set of third party parameters is comprised of a set of network specifications.

9. The method of claim 1, further comprising the steps of:
extracting transaction information from said intercepted enhanced content programming; and
storing said extracted transaction information in a data base controlled by said third party.

10. The method of claim 9, further comprising the step of displaying at least a portion of said extracted transaction information.

11. The method of claim 1, wherein the network transaction is a financial transaction and said request is a purchase request, said method further comprising the step of entering said purchase request into a data base controlled by said third party.

12. The method of claim 11, further comprising the step of displaying at least a portion of said entered user purchase request.

13. The method of claim 11, further comprising the steps of:
directing a request for additional information pertaining to said purchase request to the content provider, wherein said directing step is performed by said third party;
receiving said additional information from the content provider; and
storing said additional information in said third party controlled data base.

14. The method of claim 13, further comprising the steps of:
directing a request for updated information pertaining to said purchase request to the content provider, wherein said directing step is performed by said third party;
receiving said updated information from the content provider; and storing said updated information in said third party controlled data base.

15. The method of claim 11, further comprising the steps of:
requesting finalization of said purchase request;
finalizing said network transaction with the user receiver, wherein said finalizing step is performed by said third party; and
providing finalized transaction information to the content provider by said third party.

16. A network-based system for controlling a user transaction, the system comprising:
a network providing both standard television programming and enhanced content programming to a plurality of users, wherein the enhanced content programming includes enhanced television signal permitting user interactivity;
a receiver coupled to said network, said receiver submitting a user request for a portion of said enhanced content programming relating to the user transaction;
a content provider coupled to said network, said content provider supplying said portion of said enhanced content programming relating to the user transaction in response to said user request;
a third party controller coupled to said network for appending information to said user request, for detecting triggers embedded within said portion of said enhanced content programming supplied by said content provider in response to said user request and for intercepting said portion of said enhanced content programming supplied by said content provider in response to said user request and for determining whether the enhanced content programming includes markers inserted by the content provider in response to information appended by the third party to the user request;
a data base controlled by said third party controller, said data base containing a set of third party parameters;
third party means for determining if said enhanced content programming complies with said set of third party parameters by examining the markers; and
third party means for preventing the enhanced content programming from being received by said receiver if the enhanced content programming supplied by said content provider does not comply with said set of third party parameters.

17. The network-based system of claim 16, wherein said third party comparing means and said third party preventing means are integrated into said third party controller.

18. The network-based system of claim 16, further comprising third party means for transmitting a request for compliance with said third party parameters to said content provider if the enhanced content programming supplied by said content provider does not comply with said set of third party parameters.

19. The network-based system of claim 16, further comprising:
third party means for extracting information relating to the user transaction from said user request and from said portion of said enhanced content programming provided by said content provider, said extracted information stored in said data base; and
a display coupled to said receiver for displaying said portion of said enhanced content programming and for displaying said extracted information.

20. The network-based system of claim 16, wherein said receiver is selected from the group consisting of set-top boxes, telephones, PDAs, and computers.

21. The network-based system of claim 16, wherein said network is selected from the group consisting of cable, fiber optics, telephone lines, terrestrial broadcast systems, and satellite broadcast systems.

22. The network-based system of claim 16, wherein said third party controller obtains additional information from said content provider relating to the user transaction and stores said additional information in said data base.

23. The network-based system of claim 22, wherein said third party controller finalizes the user transaction with said receiver and provides final transaction information to said content provider.

* * * * *